US009791638B2

(12) United States Patent
Schie

(10) Patent No.: US 9,791,638 B2
(45) Date of Patent: Oct. 17, 2017

(54) LOW POWER INTEGRATED ANALOG MATHEMATICAL ENGINE

(71) Applicant: David Schie, Cupertino, CA (US)

(72) Inventor: David Schie, Cupertino, CA (US)

( * ) Notice: Subject to any disclaimer, the term of this patent is extended or adjusted under 35 U.S.C. 154(b) by 391 days.

(21) Appl. No.: 14/214,706

(22) Filed: Mar. 15, 2014

(65) Prior Publication Data

US 2014/0344200 A1 Nov. 20, 2014

Related U.S. Application Data

(60) Provisional application No. 61/787,839, filed on Mar. 15, 2013.

(51) Int. Cl.
| | |
|---|---|
| *G06N 3/063* | (2006.01) |
| *G02B 6/38* | (2006.01) |
| *G06N 3/08* | (2006.01) |
| *G06N 3/04* | (2006.01) |

(52) U.S. Cl.
CPC ........... *G02B 6/3863* (2013.01); *G02B 6/381* (2013.01); *G06N 3/0635* (2013.01); *G06N 3/08* (2013.01); *G06N 3/04* (2013.01)

(58) Field of Classification Search
None
See application file for complete search history.

(56) References Cited

U.S. PATENT DOCUMENTS 7,319,425 B2 * 1/2008 Fiorenza ................. H03M 1/38
341/166
2004/0139040 A1 * 7/2004 Nervegna .............. G06N 3/063
706/15

OTHER PUBLICATIONS

Tsung-Sum Lee (2010). Low-Voltage Fully Differential CMOS Switched-Capacitor Amplifiers, Advances in Solid State Circuit Technologies, Paul K Chu (Ed.), ISBN: 978-953-307-086-5, InTech, Apr. 2010, pp. 82-94.*
Patrick Shoemaker, Davuid O'Carroll, "Biological and Silicon Modeling of Moving Target Detection in Insects", AFRL-SR-AR-TR-04-0147, Jan. 2003, pp. 1-54.*
(Continued)

*Primary Examiner* — Wilbert L Starks
*Assistant Examiner* — Walter Hanchak
(74) *Attorney, Agent, or Firm* — Weiss & Moy, P.C.; Jeffrey D. Moy

(57) ABSTRACT

A method for creating on chip analog mathematical engines is provided utilizing a neural network with a switched capacitor structure to implement coefficients for weighted connections and error functions for the neural network. The neural networks are capable of any transfer function, learning, doing pattern recognition, clustering, control or many other functions. The switched capacitor charge controls allow for nodal control of charge transfer based switched capacitor circuits. The method reduces reliance on passive component programmable arrays to produce programmable switched capacitor circuit coefficients. The switched capacitor circuits are dynamically scaled without having to rely on switched in unit passives, such as unit capacitors, and the complexities of switching these capacitors into and out of circuit. The current, and thus the charge transferred is controlled at a nodal level, and the current rather than the capacitors are scaled providing a more accurate result in addition to saving silicon area.

7 Claims, 25 Drawing Sheets

(56) References Cited

OTHER PUBLICATIONS

Indiveri, Linares-Barranco, Hamilton, van Schaik, Etienne-Cummings, Delbruck, Shih-Chii Liu, Dudek, Häfliger, Renaud, Schemmel, Cauwenberghs, Arthur, Hynna, Fopefolu Folowosele, Sylvain Saighi, Teresa Serrano-Gotarredona, Jayawan Wijekoon, "Neuromprphc Silicon Neuron Circuits", Frontiers in NeuronScience, vol. 6, Article 73, May 2011, pp. 1-23.*

Andrzej Cichocki and Rolf Unbehauen, "Neural Networks for Solving Systems of Linear Equations—Part II: Minimax and Least Absolute Value Problems", IEEE Transaction on Circuits and systems—II: Analog and Digital Signal Processing, vol. 39, No. 9, Sep. 1992, pp. 619-633.*

* cited by examiner $(V_{in} - V_{cm})C_1 = Q_{C_1}$ $= Q_{C_1} \quad Q_{C_2} = 0$ $\Delta Q_{C_1} = \Delta Q_{C_2} = \Delta Q_C$ $V_{cm} - \dfrac{(Q_{C_1} + \Delta Q_C)}{C_1} - \dfrac{\Delta Q_C}{C_2} = 0$ $V_{cm} = \dfrac{2\Delta Q_C}{C} = \dfrac{Q_{C_1}}{C}$ $\Delta Q_C = \dfrac{Q_{C_1}}{2} + \dfrac{V_{cm}*C}{2}$ $\dfrac{-V_{in}C}{2} + \dfrac{-V_{in}C_1}{2} + \dfrac{V_{cm}*C}{2} = -\dfrac{V_{in}C}{2} + V_{cm}*C$ at end $V_{C_1} = \dfrac{Q_{C_1} + \Delta Q_C}{C}$ $= (Q_{C_1} - \dfrac{Q_{C_1}}{2} + \dfrac{\Delta Q_C}{2})\Big/C$ $= \dfrac{(Q_{C_1}}{2} + \dfrac{V_{cm}*C)}{2}\Big/C$ $= \dfrac{1}{2}\left(V_{in} - V_{cm}C + \dfrac{V_{cm}*C}{2}\right)\Big/C$ $= \left(\dfrac{V_{in}C}{2} - \dfrac{V_{cm}C}{2} + \dfrac{V_{cm}*C}{2}\right)\Big/C$ $= \dfrac{V_{in}C}{2}$ $= \dfrac{1}{2}V_{in}$ $V_x = V_{cm} - \dfrac{V_{in}}{2}$ $= V_{cm} - \dfrac{(V_{cm} + \Delta V)}{2}$ $= \dfrac{V_{cm}}{2} - \dfrac{\Delta V}{2}$

FIG. 7A

$$V_{X_{PI}2} = \frac{V_{cm}}{2} - \frac{\Delta V}{2} - \Delta Q_C / C$$

$$= \frac{V_{cm}}{2} - \frac{\Delta V}{2} - \left(\frac{-\frac{\Delta Q_C}{2} + \frac{V_{cm}}{2} - C}{C}\right)$$

$$= \frac{V_{cm}}{2} - \frac{\Delta V}{2} + \frac{\frac{Q_C}{2} - \frac{V_{cm}}{2} - C}{C}$$

$$= \frac{V_{cm}}{2} - \frac{\Delta V}{2} + \frac{\Delta V + V_{cm}}{2} - \frac{V_{cm}}{2} - \frac{V_{cm}}{2}$$

P2  $V_{X_{PI}} = V_{cm} + Q_{C_{1n}} - Q_{C_{2n}}$ $$Q_{C_{1n}} = V_{C_1}C - \left(I_1 + I_2\right)\Delta t \quad Q_{C_{in}2} = \frac{V_{in}C + V_{cm}C - I_2 \Delta t}{2}$$

$$= \frac{1}{2}V_{in}C - \left(I_1 + I_2\right)\Delta t$$

When $V_x = V_{cm}$ of ends transfer when $V_{cm} - V_{C_1} = V_{cm}$ or $V_{C_1} = 0$ $$V_{cm} - \frac{Q_{C_{1n}}}{C} = V_x \Rightarrow \frac{Q_{C_{1n}}}{C} = 0$$

$$\Delta t = \frac{V_{in}C}{2(I_1+I_2)}$$

$$V_{X_{PI}} = V_x - \frac{Q_{C_{2n}}}{C}$$

@ sw pt $V_x = V_{cm}$ $$V_{cm} - \frac{Q_{C_{2n}}}{C} = V_{X_{PI}}$$

$$V_{cm} + \frac{V_{in}}{2} - V_{cm} + \frac{I_2}{C} * \frac{V_{in}C}{2(I_1+I_2)} = V_{X_{PI}}$$

$$V_{X_{PI}} = \frac{V_{in}}{2} + V_{in}\left(\frac{I_2}{I_1+I_2}\right)$$

$$= V_{in}\left[\frac{1}{2} + \frac{I_2}{(I_1+I_2)}\right]$$

$$= \left[V_{cm} + \Delta V\right]\left[\frac{1}{2} + \frac{I_2}{2(I_1+I_2)}\right]$$

$V_{in}$ chg L
0.5
out
0.5bn
sm
$I_{1i}$-4
$I_2 = -4I_1$
$\frac{1}{2} + \frac{1}{2} = I_2$
$I_2 - \frac{1}{4}I_2$
$\frac{1}{2} + \frac{1}{2} * \frac{4}{3} = 1.1667$
$I_1 = -I_2 \infty$
$I_1 = I_2 = V_{X_{PI}}$
$I_1 = -\frac{1}{2}I_2$
=
$\frac{1}{2} + I_1 = \frac{3}{2}$
$V_{X_{PI}} = 1.5$

FIG. 7B

Log-Sigmoid Transfer Function

LOW POWER INTEGRATED ANALOG MATHEMATICAL ENGINE

CROSS-REFERENCE TO RELATED APPLICATION

This application claims priority of U.S. Provisional Patent Application Ser. No. 61/787,389 filed Mar. 15, 2013, which is incorporated herein by reference.

FIELD OF THE INVENTION

The present invention in general relates to switched capacitor circuits and in particular to a new method for implementation of low powered integrated mathematical engines.

BACKGROUND OF THE INVENTION

Miniaturized sensors & actuators such as micro-electromechanical sensors and integrated circuits (including gyros, accelerometers, GPS chip sets, micro-pumps, instrumentation amplifiers, photodetectors, microneedles, piezo-electric devices, cholesteric arrays, microcapacitive sensors, living tissue sensors, alterable form factor materials, and needle microarrays) are revolutionizing the ability to create devices for physiological, industrial, location and biometric monitoring and analysis. New low power RF interfaces are expanding the ability to track, monitor, report, interface or control with these sensors and actuators while new human interface devices are expanding the options for controlling the devices from wearable, physiological and neurological interfaces to smart sensing. In addition, new battery and energy generating technologies are also offering the promise of allowing these devices to be mounted in wearable form factors, on industrial or commercial equipment, and in remote locations due to the ability to harvest energy from the environment or operate from miniaturized batteries such as flexible paper batteries.

Although the aforementioned technologies show a lot of promise, the reality is that the distributed sensor, interface and communications revolution has been severely restricted in practice with devices created as prototypes with great fanfare that cannot be scaled with required functionality due to their high power requirements. The reason for the high power requirements is that in almost all cases the control and processing of sensor data must either be done locally with a microcontroller, digital signal processor (DSP) or field-programmable gate array (FPGA), or the raw data must be communicated to remote cloud or fixed equipment to do the real work of utilizing the data in real time.

Microcontrollers, processors, DSPs and FPGAs are components that utilize a lot of power because these components have to charge and discharge huge numbers of capacitive nodes millions or billions of times per second. Additionally, these components are usually programmed in high level languages such as C++ which increases the number of cycles required to perform mathematics or transformations. In general, the power required by leading microcontroller architectures is much too large to be utilized for significant localized processing with extremely small batteries if any operating lifetime is to be expected. The result has been that most sensors requiring significant filtering, extraction, analysis or data fusion either are prototypes demonstrated with large power sources with the future promise to be scaled, which never comes true, or a separate analysis engine is required increasing transmission requirements (as raw data must be sent) and making remote use of devices away from cellular or RF networks impossible for real time use.

A mathematical method used in digital form in microcontrollers, processor, DSPs and FPGA implementations of multi-sensor/actuator systems which have been utilized to a limited extent, primarily academically, are neural networks. Neural networks can efficiently synthesize any mathematical transfer function, and have shown unique capabilities for recognition and identification, classification, and control applications. Unfortunately, most implementations of neural networks are power hungry and slow as they have been implemented using digital means.

Analog neural networks have been shown to utilize a fraction of the current required by digitally implemented systems and are much faster due to the synchronous update of all the nodes rather than the sequential update of digital systems. Analog neural networks are often built using continuous analog multipliers. Continuous have generally been implemented as analog multipliers such as Gilbert multipliers, with extensions such as floating gate control of the multiplier inputs.

A good example of an emerging application are the personal fitness devices including bands and watches that are presently being introduced in the industry under the wearables banner. These devices do not generally have the ability to extract heart rate and higher order physiological information during motion due to the power that would be required for the analysis mathematics on digital processors or the power that would be required to transmit the raw information wirelessly to a device capable of such analysis in real time, assuming one were available. With the analog mathematical engine taught in this invention it is possible to process such information in real time due to the synchronous update capabilities of the analog neural network and at a reasonable power level due to the innovations taught herein.

While analog neural networks have many advantages, these networks still use too much power due to the continuous nature of the current connecting the neurons to produce the weightings. Additionally, analog neural networks are difficult to layout properly especially when dynamic connections are desired to modify the neural network configuration (such as number of neurons and number of layers, error propagation routine types, connections and biases). Furthermore, the current connections tend to be high impedance nodes which are susceptible to noise, glitching, leakage, and coupling problems which can reduce the effectiveness of the neural network and make layout risky and complex. Finally, floating gate technologies controlling the current into the multipliers limit the number of times the network can be modified since all floating gate technologies, whether tunneling or injected, have a limited number of write, clear and re-write cycles available. In fact, the learning processes and forward or back propagation error functions modify the charge on the floating gates so many times that the utilization of the flexible capabilities of the floating gate for multiple configurations is severely limited. Floating gate current sources which are an integral part of analog multipliers cannot be easily replaced with capacitive control with a write capability to the floating gate due to the difficulty in actively and accurately replicating the capacitive voltage to produce the required current in the multiplier, as well as the capacitive discharge characteristics over time, and as methods are attempted to do so, the additional circuitry designed to overcome offsets, leakages and temperature shifts degrade the quality of the neural network.

Switched capacitor circuits, including configurations such as switched capacitor gain circuits or cells, integrators, doublers, and filters have long been recognized as one of the best ways to implement high accuracy analog circuits without the silicon die area and inaccuracies that can result from relying on the absolute values of on-chip passive components such as resistors or capacitors. Switched capacitor circuits operate by controlling charge transfer between capacitors. Generally, charge is transferred between scaled capacitors with semiconductor switches that are switched at a frequency that effectively controls the rate of charge transfer, or current, in place of less accurate and much larger resistors that would otherwise be used. There is generally a setup or load phase or period during which inputs to the switched capacitor input capacitors are collected and then a charge transfer phase or period where the charge stored on the switched capacitor input capacitors is transferred to the output capacitors. In many switched capacitor circuits the output of the switched capacitor circuit is only accurate at the end of the charge transfer phase. Modifications to switched capacitor circuits include means to reduce or eliminate offset and noise by using additional capacitors which remove offsets or noise non-idealities using clever configurations which collect and then remove such non-idealities either during the setup or the charge transfer portion of operation. Additionally, there can be additional phases during switched capacitor circuit operation such as a period during which all switches are off or calibration phases which may happen continuously or periodically. Configurations including parasitic insensitive gain, integrator and doubler circuits as well as nulling and calibration techniques are known to those skilled in the art.

FIG. 1 is a schematic of a conventional switched capacitor inverting gain circuit 10. Operation of the switched capacitor inverting gain circuit 10 is as follows: i) With switch 1 and switch 3 closed capacitor C1 is charged to the input voltage Vin; ii) switch 1 and switch 3 open, and switch 2 and switch 4 close; iii) In order to maintain the same voltage at the inverting terminal (−) as the non-inverting terminal (+) of the operational amplifier (op amp) 12, the op amp 12 supplies a current I to produce a charge equal and opposite to the previously stored charge on C1 (Vin*C1), where the current I has to flow through C2, which then charges C2 to a voltage of −(C1/C2)*Vin, and produces that voltage on the output (Vout) at the end of the charge transfer period since the inverting terminal is held by the op amp 12 at ground.

FIG. 2 shows an alternate implementation of a conventional switched capacitor circuit 20. In FIG. 2, the op amp 12 of FIG. 1 is replaced by a current source 22 and a comparator 24. Activation of the switch 26 to voltage vp simply ensures that voltage vx is pulled below the reference voltage of the comparator during each cycle (ie., vp must be less than the reference, vcm or ground). The operation is similar to the previous example: i) switch 1 and switch 3 close charging C1 to Vin; ii) switch 1 and switch 3 open and switch 2 and switch 4 close; iii) with switch 2 and switch 4 closed the switch 26 turns on, then current source 22 (I1) is enabled, and then 26 turns off. In this case the current source 22 will supply a current the same way that the op amp 12 of FIG. 1 did. Except, in this case the comparator 24 detects that voltage vx has reached the reference (vcm or ground), and disables the current source 22 once voltage vx reaches the reference (vcm or ground). Thus at the end of the charging period, the nodes are at the same potential as they were in the op amp case of FIG. 1, but the complexity of the op amp, including its loop response, offset, current demand and other non-idealities are replaced with a simple open loop comparator 24 and current source 22 combination. The node vx will not reach ground until the charge previously stored on C1 (Vin*C1) is cancelled by exactly the same negative charge. The current which creates this charge must flow through C2 to reach C1 and therefore C2 will charge up to −(C1/C2)*Vin.

As shown in FIG. 2, the capacitor ratio (C1/C2) controls the voltage gain, and it is common to scale capacitors so as to control voltage according to the ratio of charge transfer (Q) in various switched capacitor circuits as Q=CV if capacitance C changes so will voltage V for a given charge Q). For example, in FIG. 3 the op amp and comparator/current source based switched capacitor circuits use unit capacitors which may be switched into and out of the circuit to control the voltage gain as described above. This type of circuit is commonly seen in data converters, filters, programmable gain circuits and other critical precision analog applications.

However, the reliance upon unit capacitors for matching or programmability requires careful attention to the capacitor layout and also requires a lot of silicon area. For example, dummy capacitors, routing, matching techniques, trim, and other measures are required to combat parasitics and the problems grow as the number of unit capacitors grows limiting the dynamic range of programmability. Unit capacitor matching often requires complex layout analysis and parasitic extract, and often re-spins of silicon. Furthermore, as additional switches and wires are utilized parasitic capacitances change causing errors in the circuit such as charge injection from mis-matched switches. In the op amp circuit of FIG. 1 it is not possible to scale the currents to the two capacitors (C1, C2). Also, as the input voltage must be fully loaded across C1, it is not possible to control the charge on C1 without complex voltage to current converters, which would degrade the accuracy of the switched capacitor circuits and make them undesirable for use.

The limitations of capacitor arrays to be utilized as weighted neurons with multiple inputs therefore limits the effective resolution of the weightings and summer functions to about five hits, and severely limits the capability of synthesizing transfer functions and functionality of the neural networks using capacitor arrays.

It would therefore be desirable to produce a switched capacitor circuit which may be dynamically scaled without having to rely on unit passives, such as unit capacitors, and the complexities of switching these capacitors into and out of circuit. It would be further desirable if the current provided, and thus the charge transferred could be controlled at a nodal level, such that selected capacitors within a switched capacitor circuit may see scaled currents, and the current rather than the capacitors could be scaled. As relative current accuracy is much easier to achieve using current mirrors than laying out switched capacitors arrays is, the result would therefore be more accurate in addition to simplifying the solution and saving silicon area.

Furthermore it is desirable to produce a neural network based upon neurons using a weighted input, summer, decision circuit methodology that is more power efficient than a continuous implementation, that is resilient to noise coupling, and allows modifications to enable re-configuration of the neural network without significant difficulty. Specifically, it would be desirable that the neural network may be trained by adjusting dynamic transconductors, and then once the error function is minimized the transconductor magnitudes may be connected to non-volatile storage, such as analog floating gate or digital eeprom or flash to remember desired weightings and biases, where the non-volatile memory or storage devices are limitedly used and not degraded during learning or multiple learning events.

SUMMARY OF THE INVENTION

A method for creating on chip analog mathematical engines is provided utilizing a neural network with neurons based upon an improved switched capacitor structure to implement coefficients for weighted input connections. These neurons may then be used to couple internal hidden layers to the input layer and to couple the final internal hidden layer to the output layer. An error minimizing function may then propagate in a feed forward/feedback or combined manner to train the network according to a desired output layer response to a provided input layer. The neural networks are capable of any transfer function, learning, doing pattern recognition, clustering, control or many other functions. The switched capacitor charge controls allow for nodal control of charge transfer based switched capacitor circuits. The method reduces reliance on passive component programmable arrays to produce programmable switched capacitor circuit coefficients. The switched capacitor circuits are dynamically scaled without having to rely on unit passives, such as unit capacitors, and the complexities of switching these capacitors into and out of circuit. The current, and thus the charge transferred is controlled at a nodal level, and the current rather than the capacitors are scaled providing a more accurate result in addition to saving silicon area. Furthermore, the weightings and biases now set as currents may be saved and recalled by coupling current source bias circuits to non-volatile memory means such as analog non-volatile memory. Finally, neural networks of any size smaller than the total number of neurons may be created by multiplexing the input and output connections of the neurons and/or by not gating unused neurons to save the power associated with the transfer. This breaks the conventional paradigm of analog circuits as being inflexible as now any arbitrary type of neural network may be constructed up to the number of neurons available.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7A-7B shows a derivation of the control function based on a charge balance for the circuit in FIG. 4, except the sign of I2 is opposite in the derivation;

DESCRIPTION OF THE INVENTION

The present invention has utility as a new method for creating on chip analog mathematical engines. Embodiments of the inventive method utilize a neural network and a novel switched capacitor structure to implement coefficients for the weighted connections and error functions for the neural network. Embodiments of the neural networks may be synthesized to be capable of implementing any transfer function, learning, doing pattern recognition, clustering, control or many other functions. The switched capacitor charge controls used in embodiments of the invention allows for nodal control of charge transfer based switched capacitor circuits. Embodiments of the inventive method may be used to reduce reliance on passive component programmable arrays to produce programmable switched capacitor circuit coefficients. Embodiments of the invention provide a switched capacitor circuit which may be dynamically scaled without having to rely on unit passives, such as unit capacitors, and the complexities of switching these capacitors into and out of circuit. In embodiments of the inventive circuit, the current provided, and thus the charge transferred may be controlled at a nodal level, such that selected capacitors within a switched capacitor circuit may see scaled currents, and the current rather than the capacitors are scaled. As relative current accuracy is much easier to achieve by using current mirrors rather than laying out switched capacitors arrays, the result is therefore more accurate in addition to simplifying the solution and saving silicon area.

Figure 1:
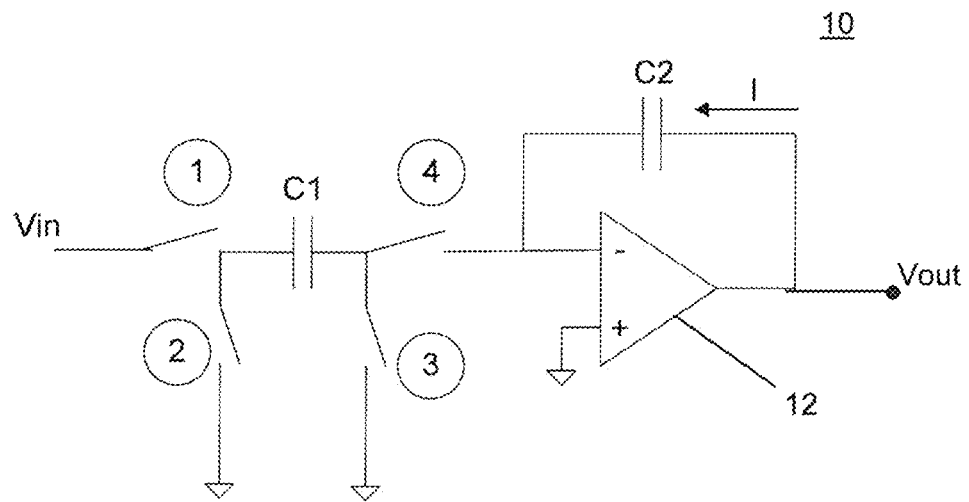
FIG. 1 is a schematic of a standard operational amplifier (op amp) based switched capacitor integrator, or if C2 is shorted each cycle a gain circuit is realized.
Figure 2:
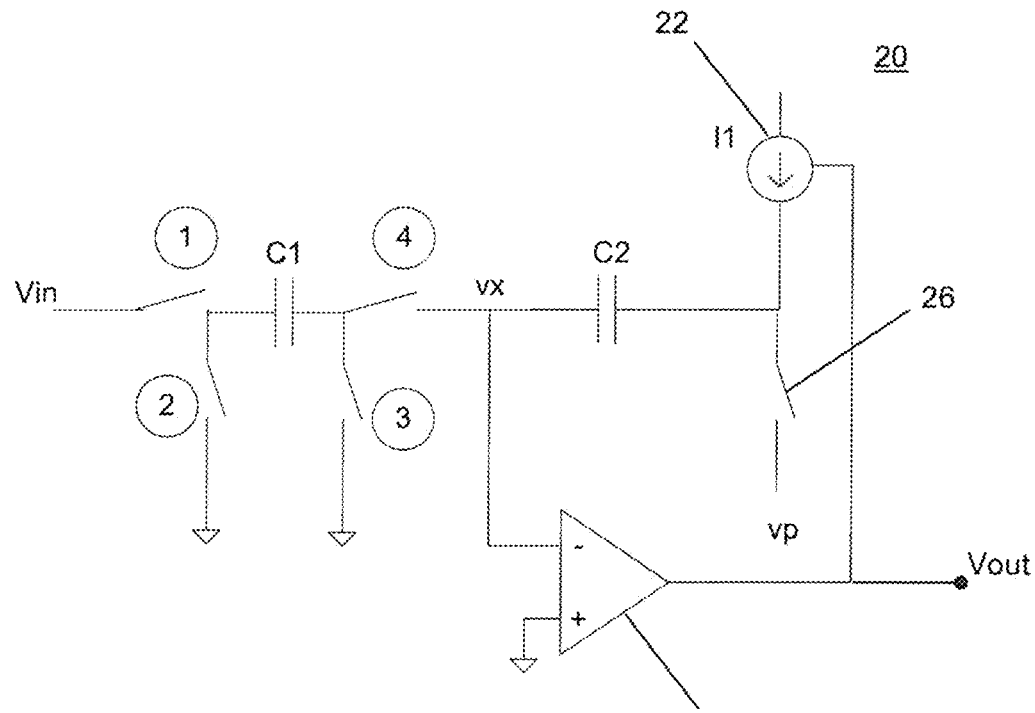
FIG. 2 is a schematic based on the switched capacitor integrator or gain circuit of FIG. 1, were the op amp is replaced by a current source, a comparator, and a switch pulling the comparison node to a potential lower than the comparator reference voltage.
Figure 4:
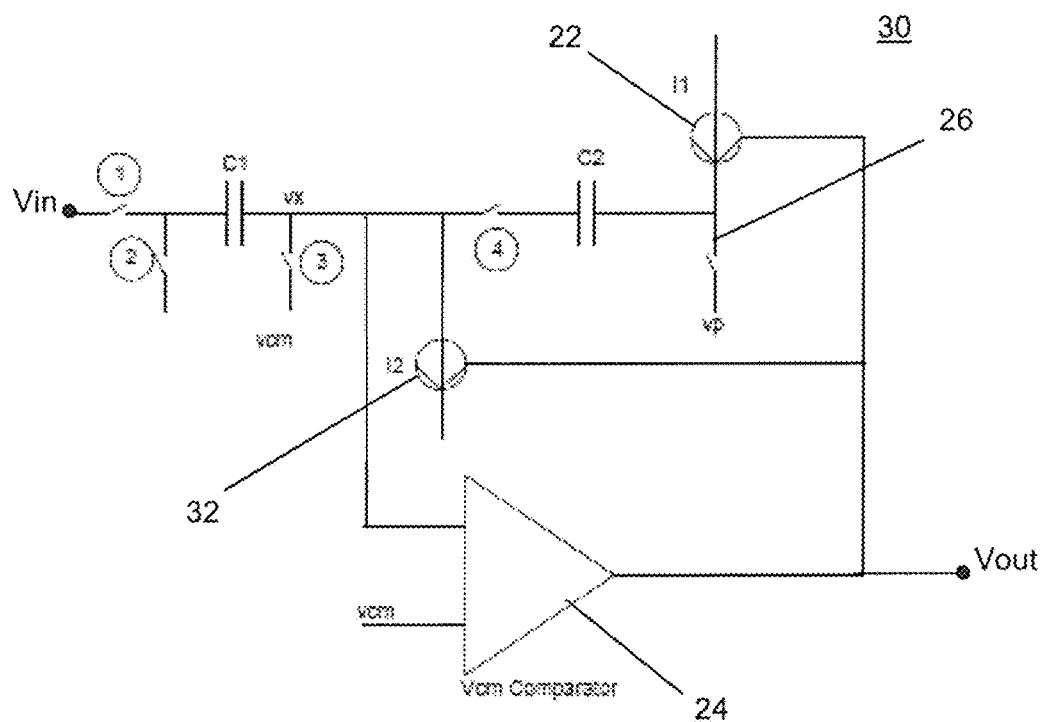
FIG. 4 is a schematic where an additional current source sums a proportional but differing current into the comparator reference node so as to change the charge accumulating on the two capacitors to program the gain, or alternatively, the second current source (I2) may be related by a duty cycle to the first current source (I1), such that I2 turns off before I1 so as to create different charges on each of the capacitors and program a gain with a duty cycled current source I2 according to embodiments of the invention.

Referring now to the figures, FIG. 4 in an inventive switched capacitor circuit 30 that is based on the conventional switched capacitor circuit 20 of FIG. 2 with the addition of a second current source (I2) for an extra degree of freedom. In circuit 30 the second current source I2 is proportional to current source I1, and current source I2 is used to discharge the node vx. It is well known to those skilled in the art that highly accurate current mirrors and bias circuits can be created, thus it is not difficult to create a discharge current I2 which is related by a duty cycle (D) to the current I1 such that the I2 current is D*I and the charge current is I, or to make I1 and I2 continuous but scaled relative to each another. More specifically the magnitude of currents may be set relative to one another, or one current source may be turned on some time after the start of the charge transfer phase and/or turned off some time before the other to reduce its conduction time relative to the other. In both cases a controlled charge ratio will be transferred. In the following discussion D or duty cycle will be referenced to indicate either the current magnitude scaling or the current source on time scaling technique. In some cases the technique described may work for only one or the other of these techniques as will be clear to those skilled in the art. The operation of circuit 30 is as follows: i) C1 charges to Vin after switch 1 and switch 3 close ii) switch 1 and switch 3 open and switch 2 and switch 4 close. iii) switch 26 closes then current source 22 (I1) turns on, then switch 26 opens and current source 32 (I2) is turned on with the I2 current being D*I1 (where D is a duty cycle between 0 and 1). For example if D were 0.8 then I2 would be sinking 0.8 I and I1 would be supplying I. C1 would see 0.2 I and therefore it would take five times (5×) as long to charge to the point that voltage vx would rise to voltage vcm and turn off the current sources as it would with a duty cycle of 0 (no current source sink at the comparison node). During all of this time capacitor C2 continues to see the full charging current I. It will therefore receive five times (5×) the charge and produce a voltage across C2 five times (5×) as large as it would with a duty cycle of 0 (no current source sink at the comparison node). For those skilled in the art, this added degree of freedom where matched but scaled current sources are used to modify the charge balance into switched capacitors at charge transfer nodes, may be used to create programmable switched capacitor circuits including gain, doubler, integrator, filter and other circuits.

Figure 5:
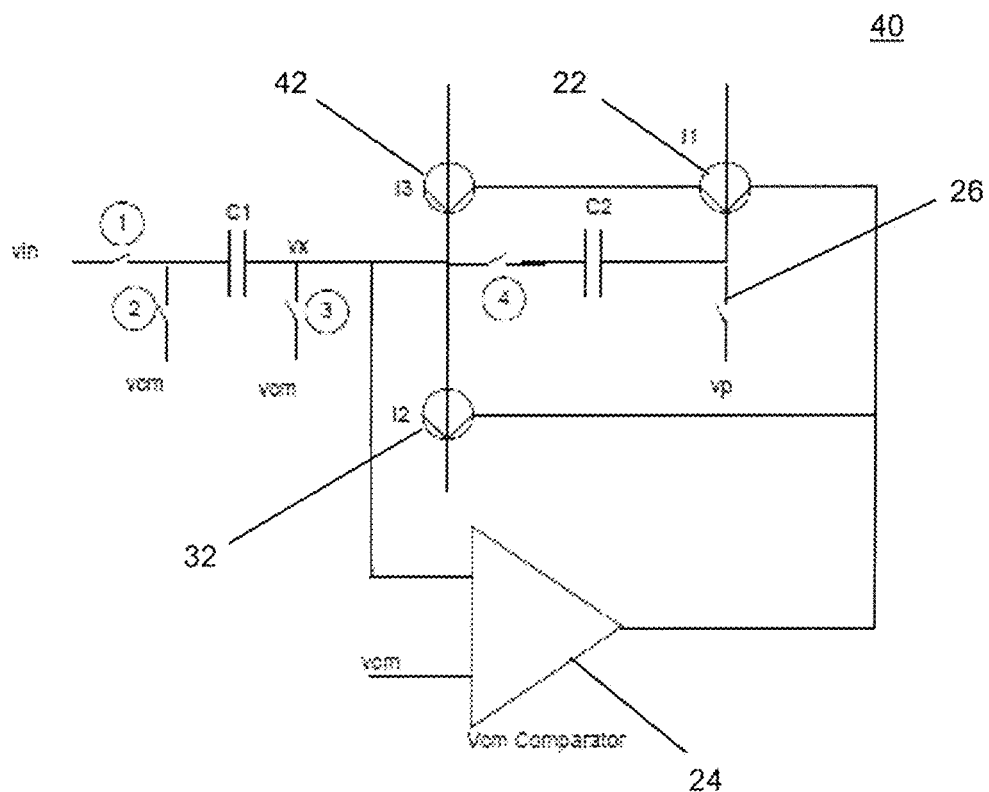
FIG. 5 illustrates a schematic showing how current source I2 of FIG. 4 may be positive or negative according to embodiments of the invention if I2 and I3 are combined.
Figure 6:
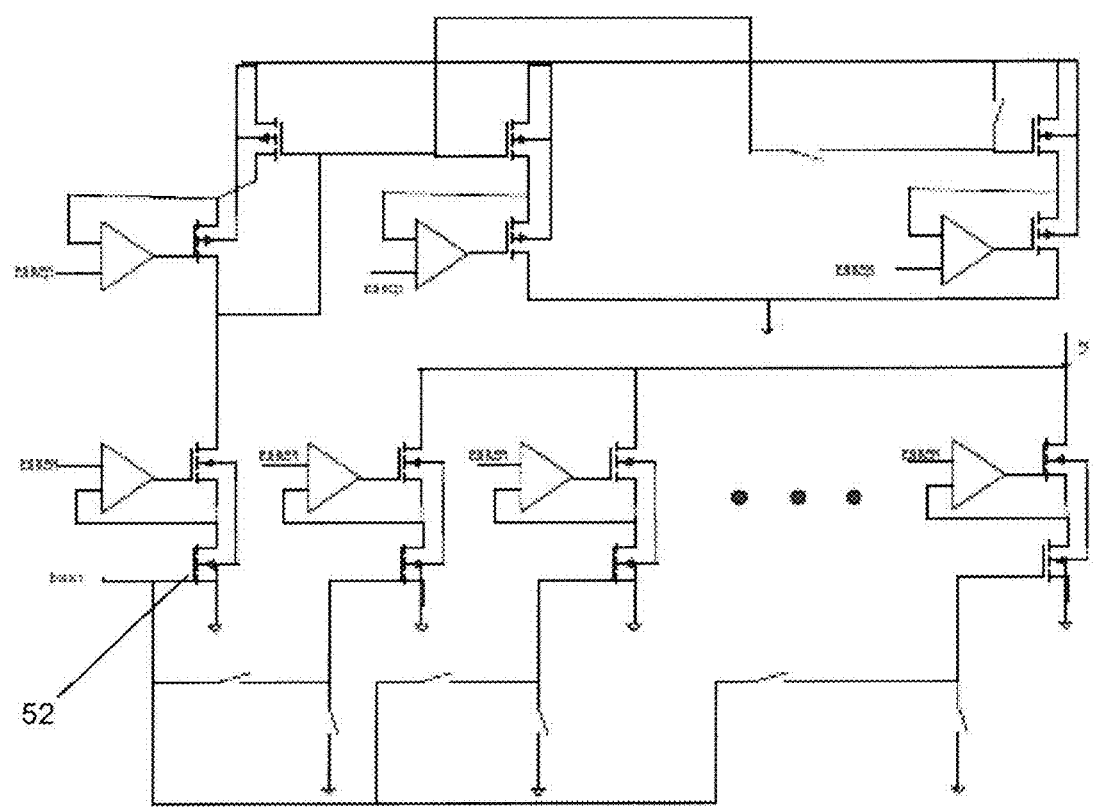
FIG. 6 is a schematic of a proportional but scaled programmable current sources according to an embodiment of the invention.

FIG. 5 introduces a circuit 40 that further extends the concept with a third current source 42 (I3), and by allowing either charge or discharge of the node described above such that the voltage change across C2 may be either scaled to be larger or smaller than across C1 during each cycle. In FIG. 5 the current sources may be both a summing or a subtracting current source, where the comparator based gain cell may provide gain or attenuate (create positive or negative gain). The current sources 22, 32, and 42 (I1, I2, and I3) may be made programmable relative to one another, yet accurate against the same input bias, by using a programmable current source fanout such as that shown in FIG. 6. In FIG. 6 a bias current is derived from biasn and provided as a potential to the second side of a mirror formed by the common source transistor 52 on the bottom left of FIG. 6 whose gate is connected to the node held at biasn. The bias potential, biasn, may be implemented as a wide swing bias or utilize one of the many schemes known by those skilled in the art that are available to make the current independent of process parameters and temperature, or to vary the bias against such parameters in a desirable way. The current source fanout circuit 50 shown in FIG. 6 utilizes groups of parallel current mirror outputs which may be identically sized, or sized digitally (successively doubling) or otherwise sized relative to one another. The n-channel and p-channel parallel arrays are created from biasn such that they will be accurate relative to one another, but different in scaled proportion. Supercascodes are also shown and will be known to those skilled in the art as a means by which to maximize output impedance and thus minimize lambda errors due to finite output voltages. The parallel current mirrors are either turned on or off according to the switches, which either connect the current sources by connecting the bias gate) to their respective voltage biases or to their respective rails to turn them off (and separate them from the bias voltage if they are turned off). Alternate embodiments which utilize a series switch to enable or disable the current sources or re-use the cascode as a series switch to turn on and off the current sources will be known to those skilled in the art. Regardless of the scheme used, these parallel current sources are summed to form a programmable current sources I1, I2, I3 and could be extended using the same technique to produce any number of programmable current sources which are accurately scaled to one another according but with a programmable scale factor. Alternatively, the current sources I2 or I3 could have a limited duration of operation each cycle or operate according to a duty cycle so as to control the net charge transferred, and wherein a timing based duty cycle difference creates the scaling factor.

The control function related to the switched capacitor circuit depicted in FIG. 4, except I1 and I2 are reversed, is Vout=Vin*[½+½*I2/(I2−I1)] for equal input and output capacitor values. I2 can be positive or negative and therefore the output may be larger or smaller than the input. If a common mode voltage other than ground (gnd) is used (vp can remain grid or any consistent value lower than the reference even with a different common mode), then the different charging rates on the two capacitors must be considered. If Vin=Vcm+deltaV, where deltaV is the value of interest and Vcm is the common mode, then Vout=[Vcm+deltaV][0.5+0.5*I2/(I2−I1)]. The value of Vp must also be considered. The derivation of this equation is shown in FIG. 7, with the derivation of the control function based on a charge balance for the circuit in FIG. 4, except the sign of I1 is opposite in the derivation; Some notes verifying the transfer function with Cadence Ultrasim simulations are also presented. Clearly there will be an additional charge component on the output proportional to Vcm. To remove this additional charge, a replica circuit is required on the negative terminal with Vcm as the input without delta V. In a differential structure this will produce a −Vcm*[0.5+0.5*I2/(I2−I1)] to subtract out the charge added on the positive terminal by the common mode voltage. Similarly a method must be used to remove the error due to Vp resulting from the difference in charge on the input capacitors and the output capacitors due to their scaled charge rates. One method would be to correct the output digitally. To determine the digital error correction required, each time the ratio of currents is changed, a 0V input could be input into the input capacitor(s) and the resulting error on the output capacitor recorded. As the input capacitor(s) have to be charged with a charge opposite that imparted by Vp, just like it does the charge imparted by Vin, if it is to reach the common mode, therefore the resulting output error would be the systematic error at a given current ratio. Where the charge ratio is 1:1 this error does not occur since the Vp charge is reversed equally during the charge transfer phase.

The use of a comparator based switchcap circuit reduces the current significantly compared to switched capacitor amplifiers which rely on an op amp. Additionally, this open loop methodology reduces the settling time, common mode feedback circuitry, and all of the current sources associated with such implementations. More importantly, however, the control of current sources either through magnitude control (digital, analog bias with transconductor, or duty cycle) can be controlled to far greater precision than matched capacitors and thus more equivalent bits of weighting can be applied to the weightings on the neuron inputs.

Small lithography processes coupled with a comparison based switched capacitor methodology makes it easy to produce large switch arrays which allow a large number of potential neuron connections or configurations changes such that the number of neurons, number of layers, and weightings may be re-configured easily. Additionally, as the current sources are being controlled on a cycle by cycle basis it is easy to transfer learned information, when desired, to a floating gate so as to record weightings compared to the continuous neural network based on multipliers which do not have a similar opportunity to transfer such information either to read or write because the floating gates are inherently part of the multiplier and not contained in separate bias sources which can be easily replicated (with mirror legs for example). This makes it much more difficult to store synchronously with operation and also reduces floating gate lifetime as the gates must be adjusted during the error propagation training process rather than after error is minimized as in the present invention.

Charge injection associated with a variable number of connections, however, can still cause minute errors associated with the finite propagation time and metastability considerations of the comparator being used for the comparator based switched capacitor. To overcome this a nulling procedure is introduced which adds additional common mode channels to each neuron which will record any error during part of the cycle and remove it during the other part of the cycle in a method analogous to parasitic insensitive offset loading of switched capacitor circuits, but utilizing a completely different methodology. This methodology removes any errors, usually charge injection, associated with varying number of connections to one node of a switchcap circuit being used as a neuron weighted connection(s) and summer. The neuron weighted connectivity and a summer, the core building block of neural networks, uses less power than other methods, and can be easily be reconfigured, is accurate to multiple bits of weighting (>5 bits), and eliminates errors associated with a variable number of connections.

Figure 3:
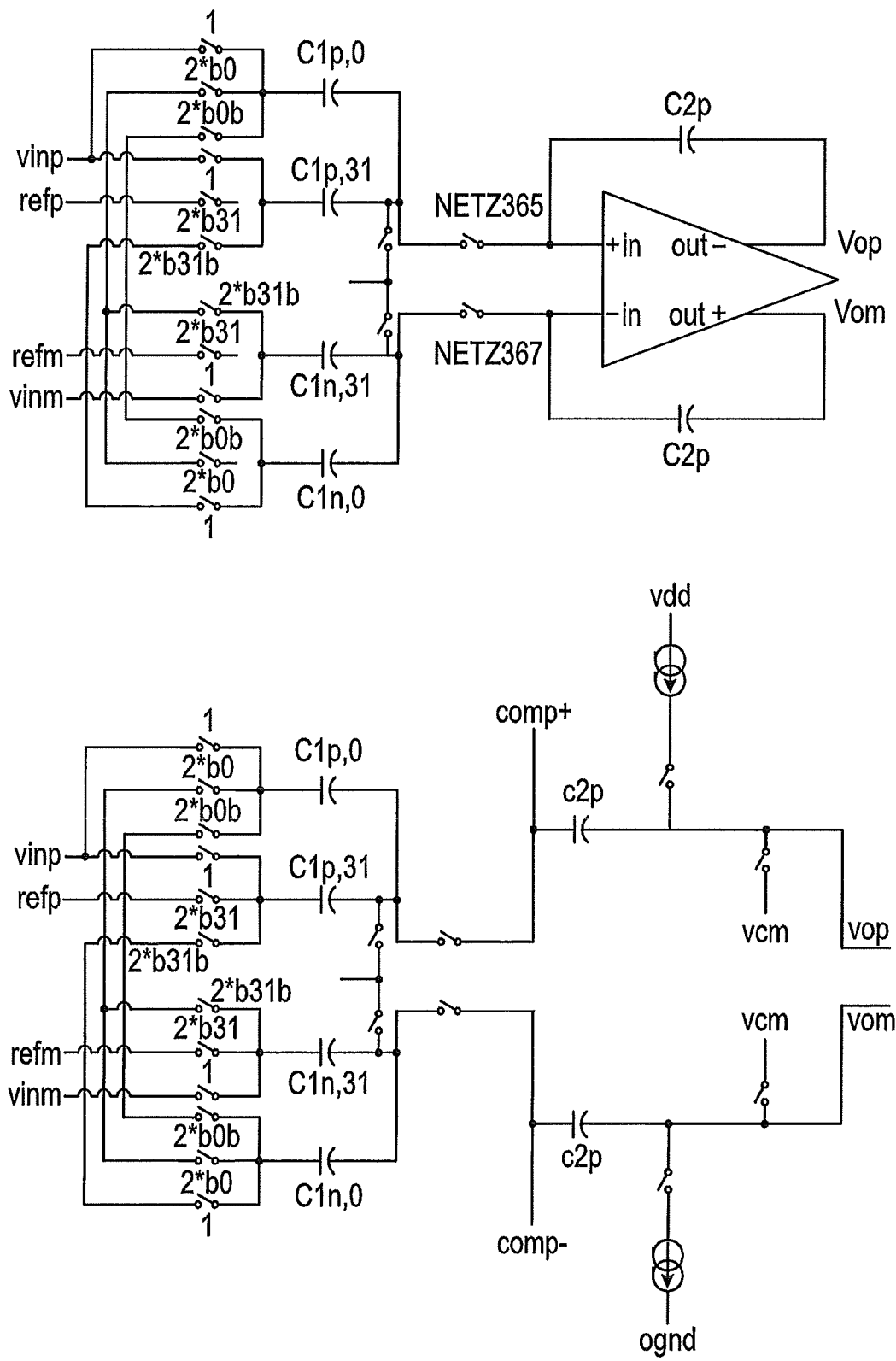
FIG. 3 is a schematic of a passive capacitor array where unit capacitors are switched into the integrator or gain circuits of FIG. 1 and FIG. 2 according to a digital control word, so as to program the gain of the switched capacitor circuits in conformance with the digital control word.
Figure 8:
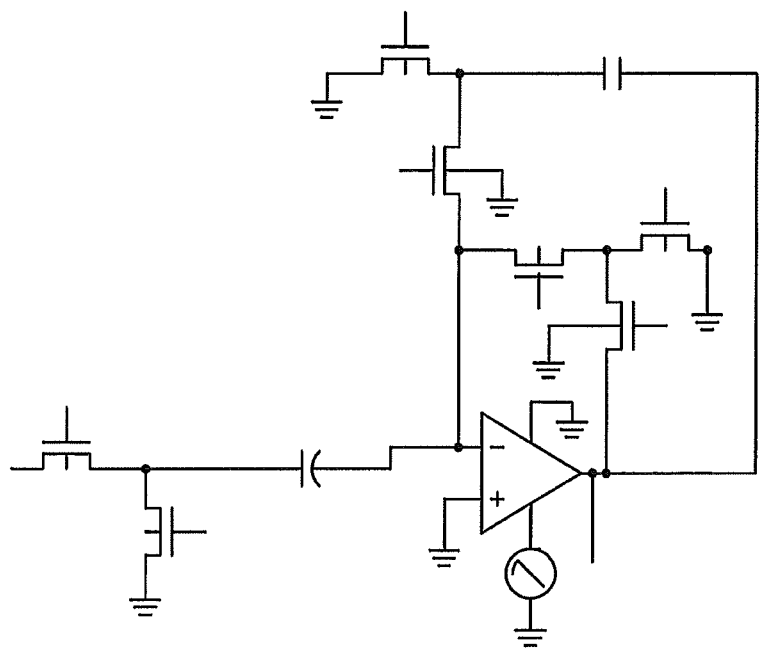
FIGS. 8 and 9 are schematic diagrams of op amp based parasitic insensitive switched capacitor topologies which load in op amp non-idealities such as an offset and remove them each cycle thereby acting as offset nulling means.
Figure 9:
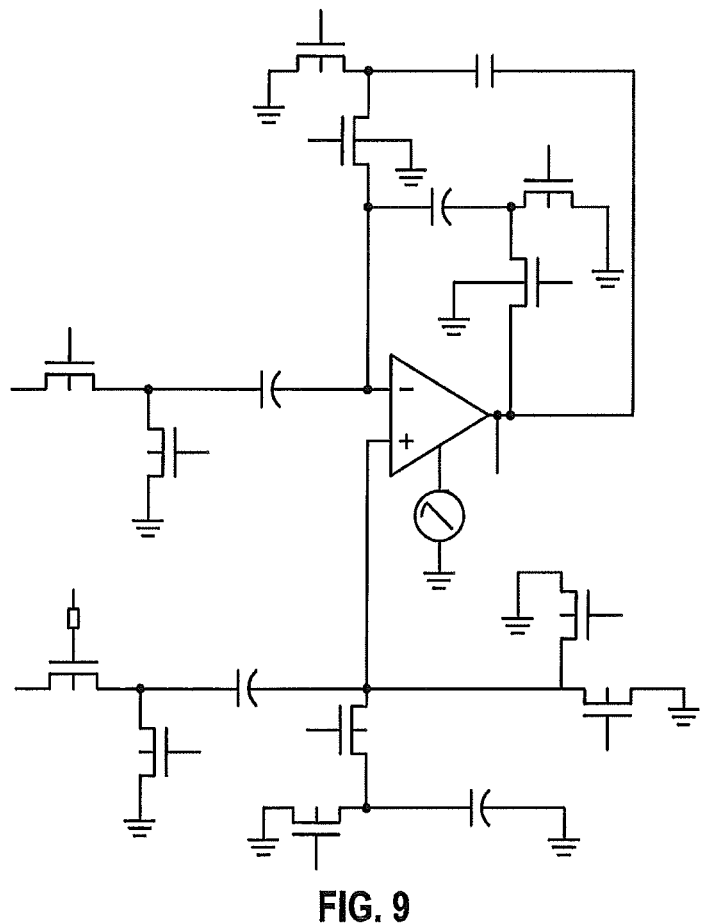

FIGS. 8 and 9 are schematic diagrams of op amp based parasitic insensitive switched capacitor topologies which load in op amp non-idealities such as offset and remove them each cycle. This type of circuit is not compatible with the comparator and current source based switched capacitor approach. FIGS. 8 and 9 are readily recognized by those skilled in the art as examples of non-differential and differential parasitic insensitive switched capacitor circuits, respectively, where the offset of the operational amplifier is effectively removed making the circuits more accurate than their continuous counterparts. As there is no operational amplifier in the comparator and current source techniques described, we therefore require a different method by which to achieve such accuracy The nulling technique can be implemented by adding an additional switched capacitor input leg (such as a leg similar to those illustrated in FIG. 3) summing into the comparison node where the input to that switched capacitor leg input is the common mode. If the same current sources are used as in input leg(s), and the same comparator is used but both the loading and charging portions occur during the portion of the cycle when the primary current sources are not active, then a charge equal to the error caused by the finite propagation and other non-idealities of the comparator will be loaded onto the capacitor. If this capacitor is then subtracted from the comparison node during the charge period, when the primary current sources are on, the error due to the comparator will be removed in a process analogous but different to parasitic error removal schemes of FIG. 8 and FIG. 9.

Figure 10:
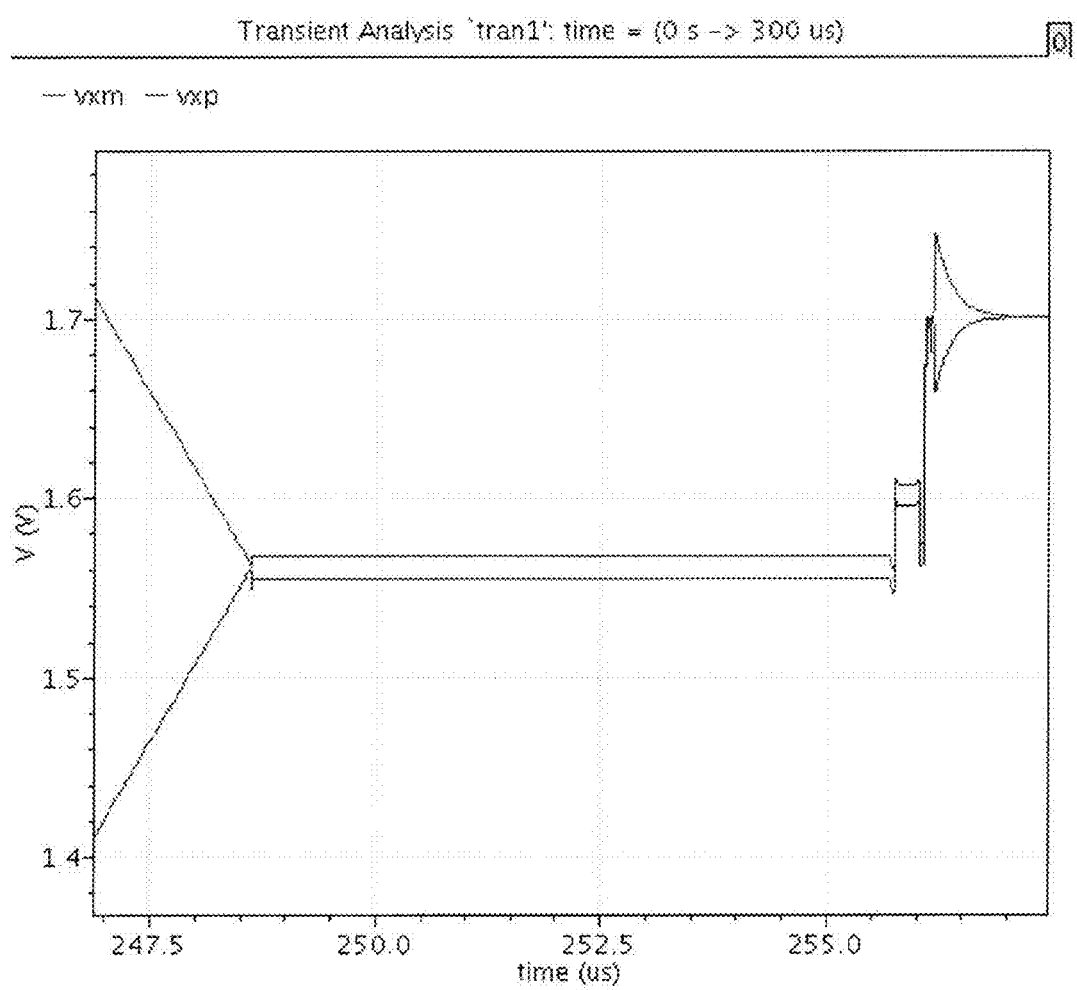
FIG. 10 graphical representation of the error caused by the finite propagation delay of the comparator between the reference node and the feedback node.
Figure 11:
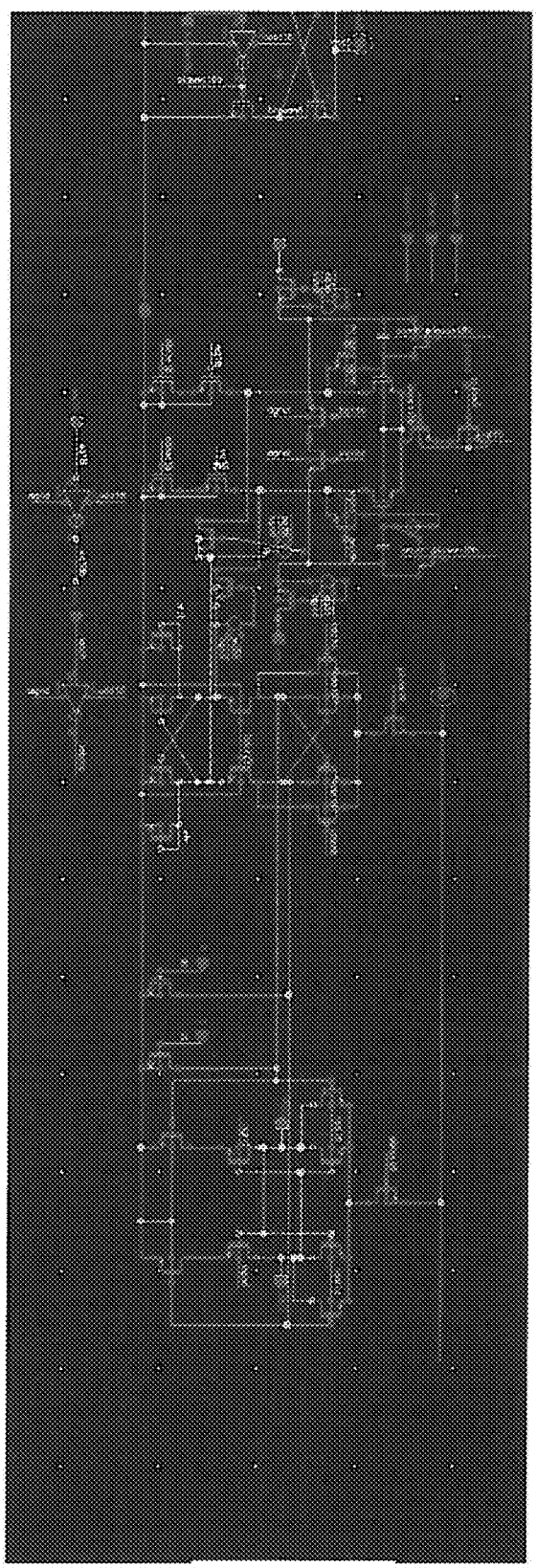
FIG. 11 is a schematic of a fast comparator topology.
Figure 12:
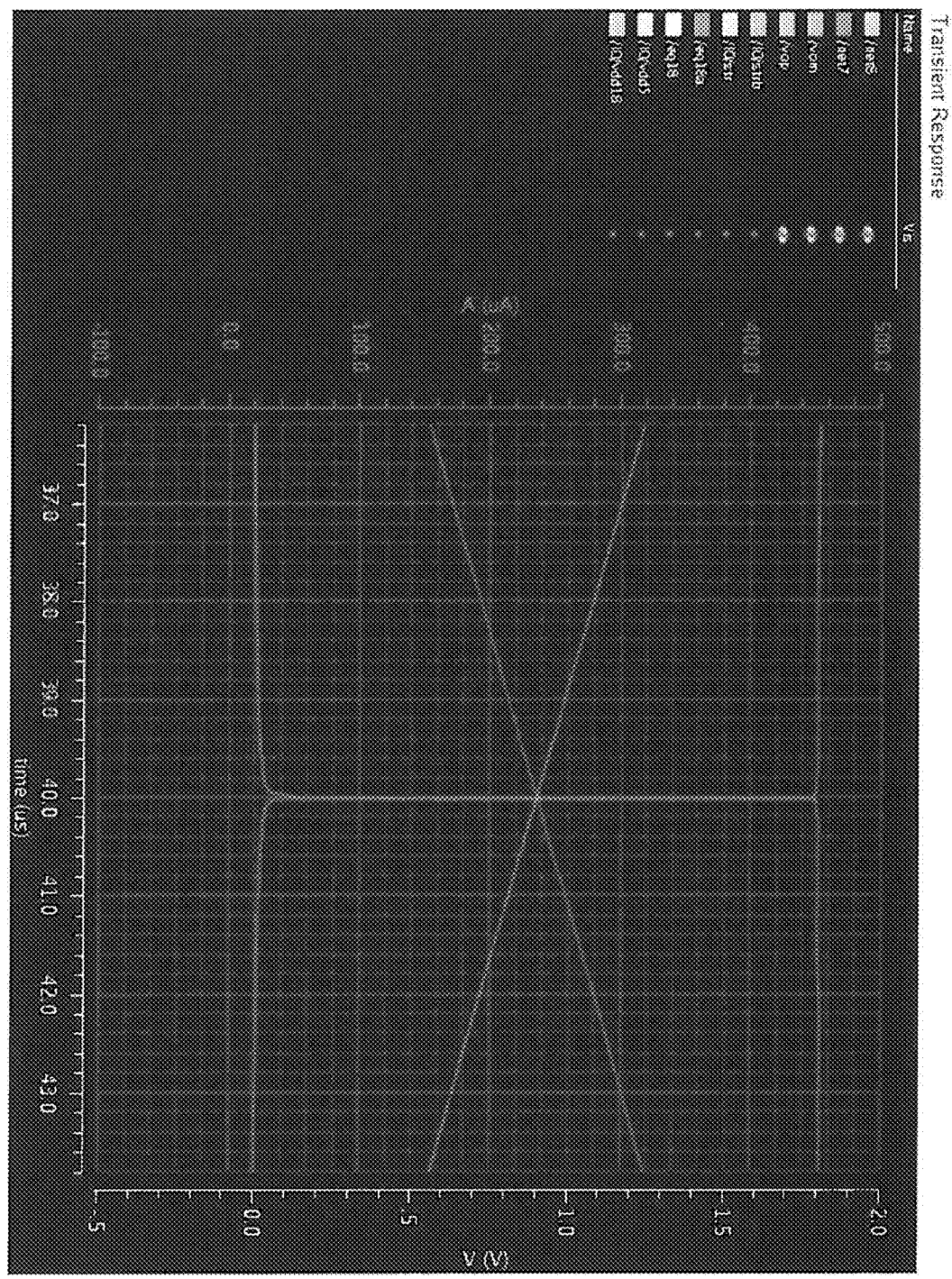
FIG. 12 is a simulation of the comparator operation transient response.
Figure 13A:
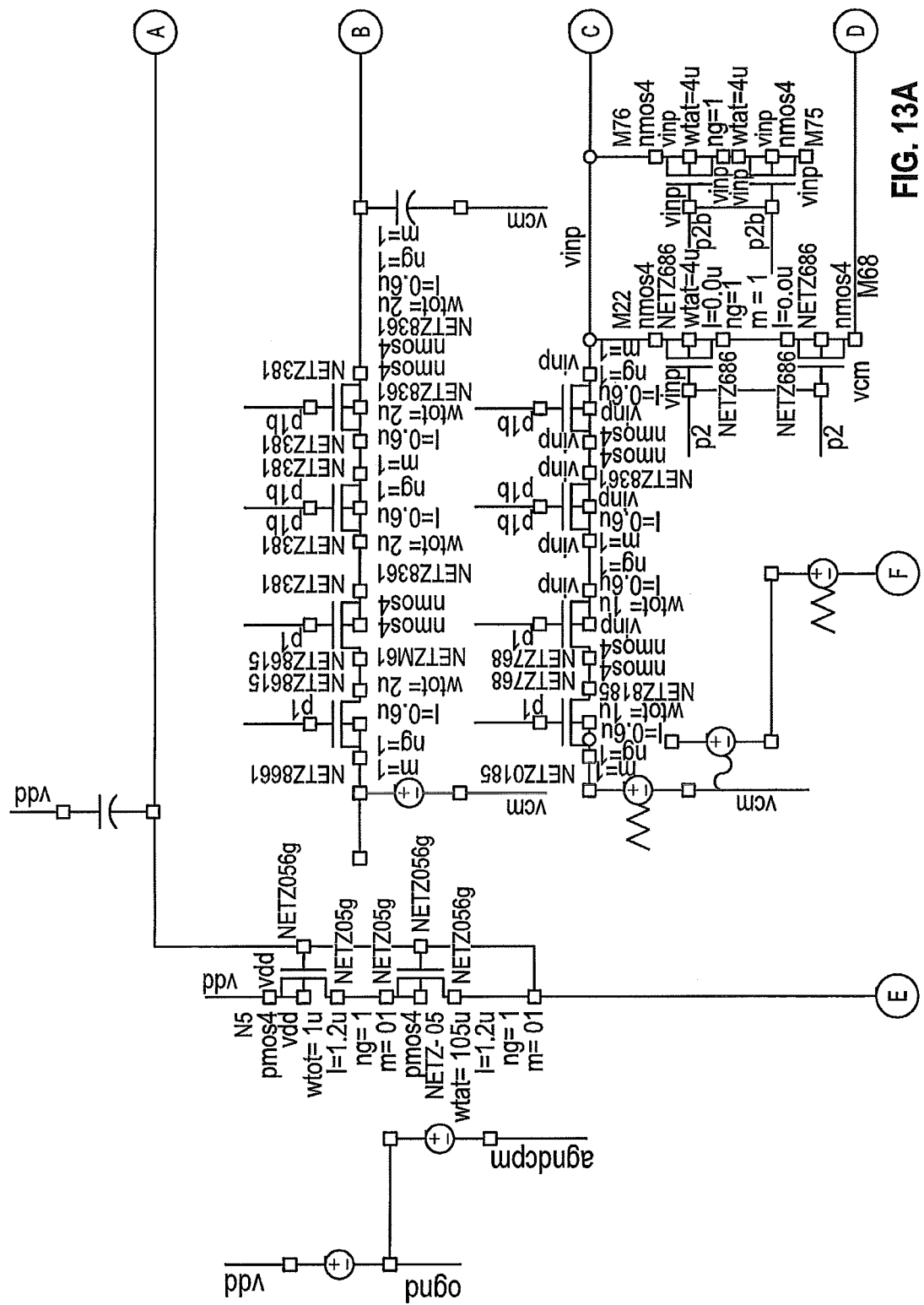
FIG. 13A-13I shows an actual implementation of the inventive switched capacitor circuit including a comparator at the transistor level.
Figure 13B:
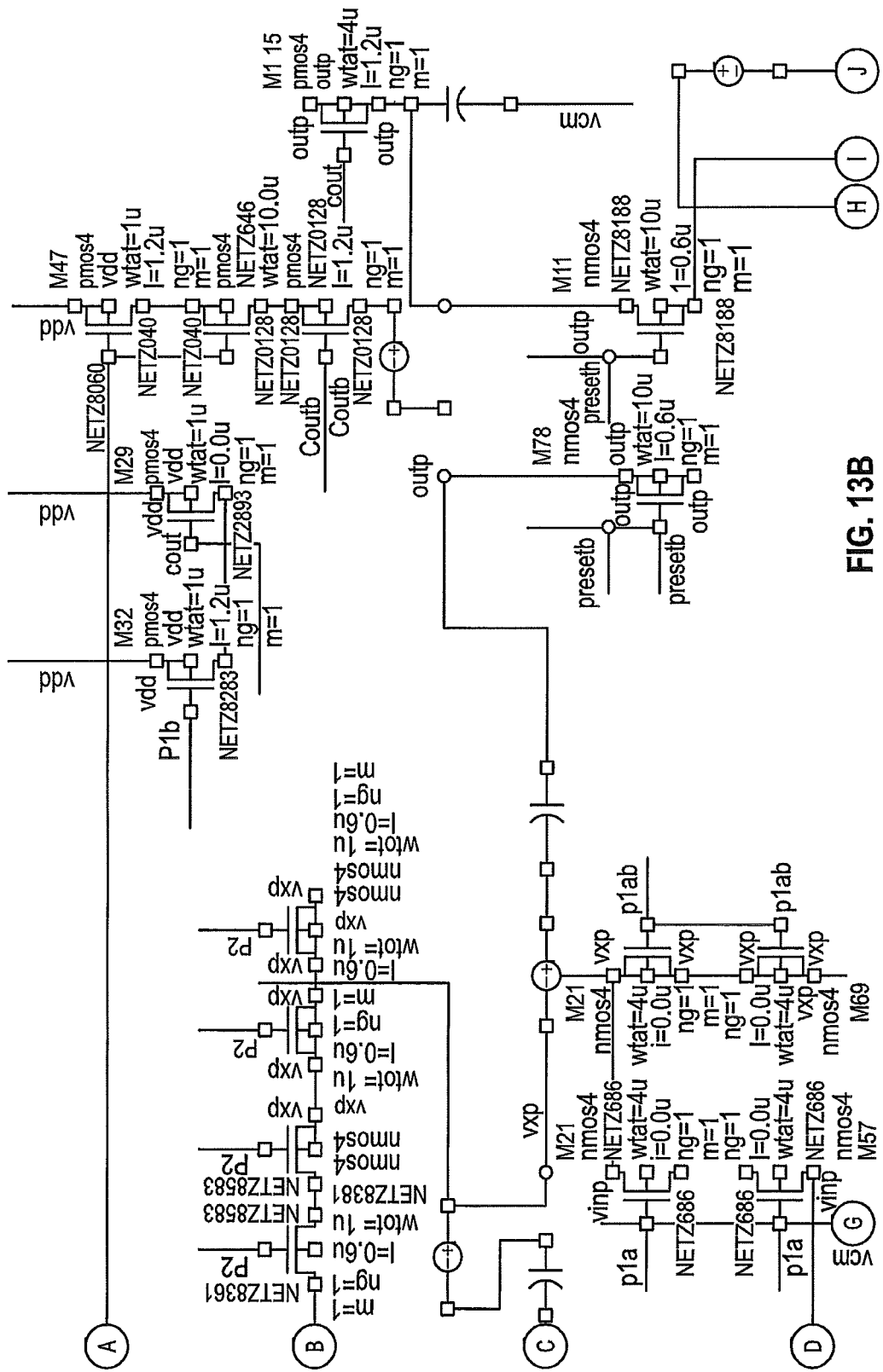
Figure 13C:
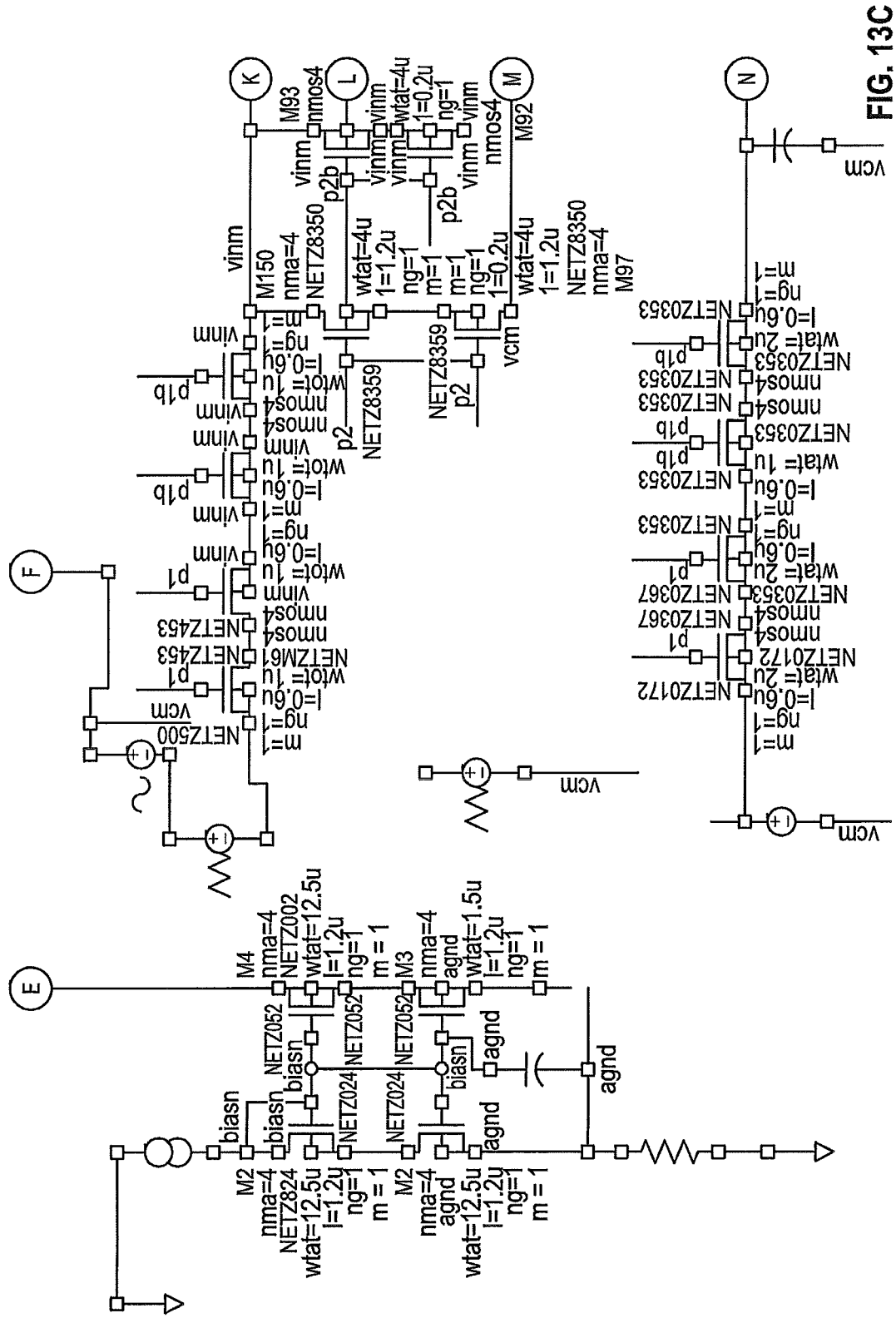
Figure 13D:
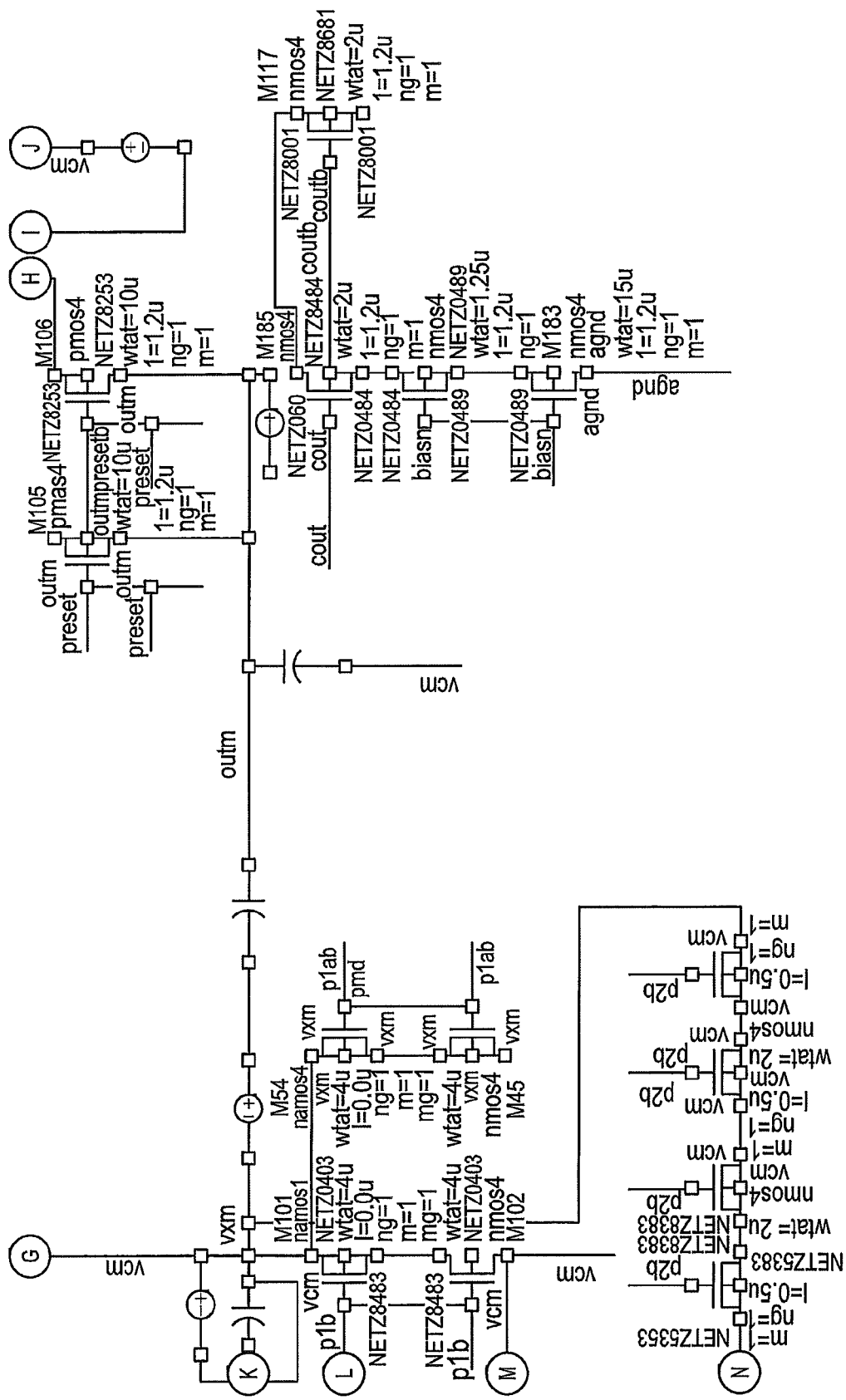
Figure 13E:
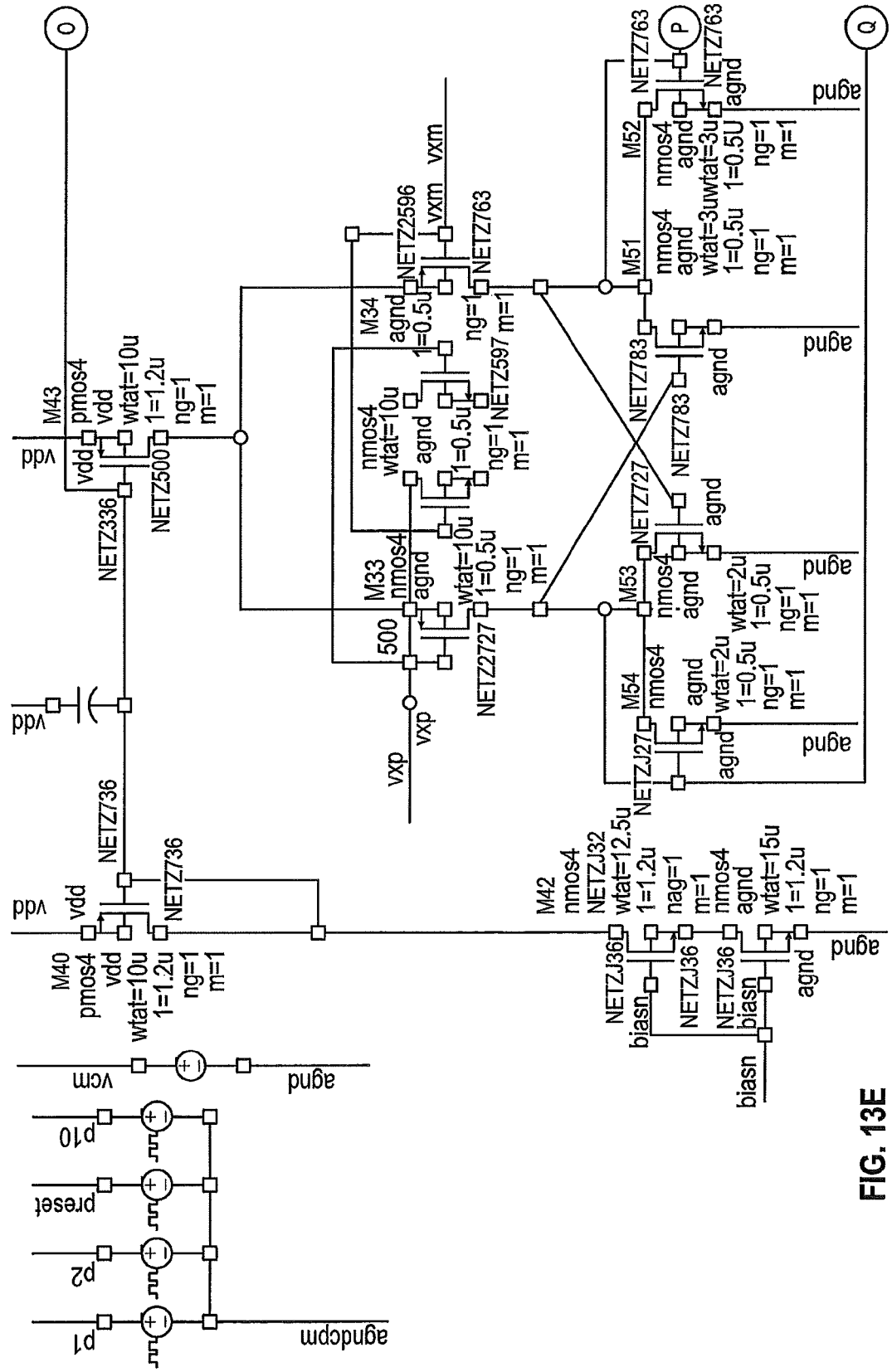
Figure 13F:
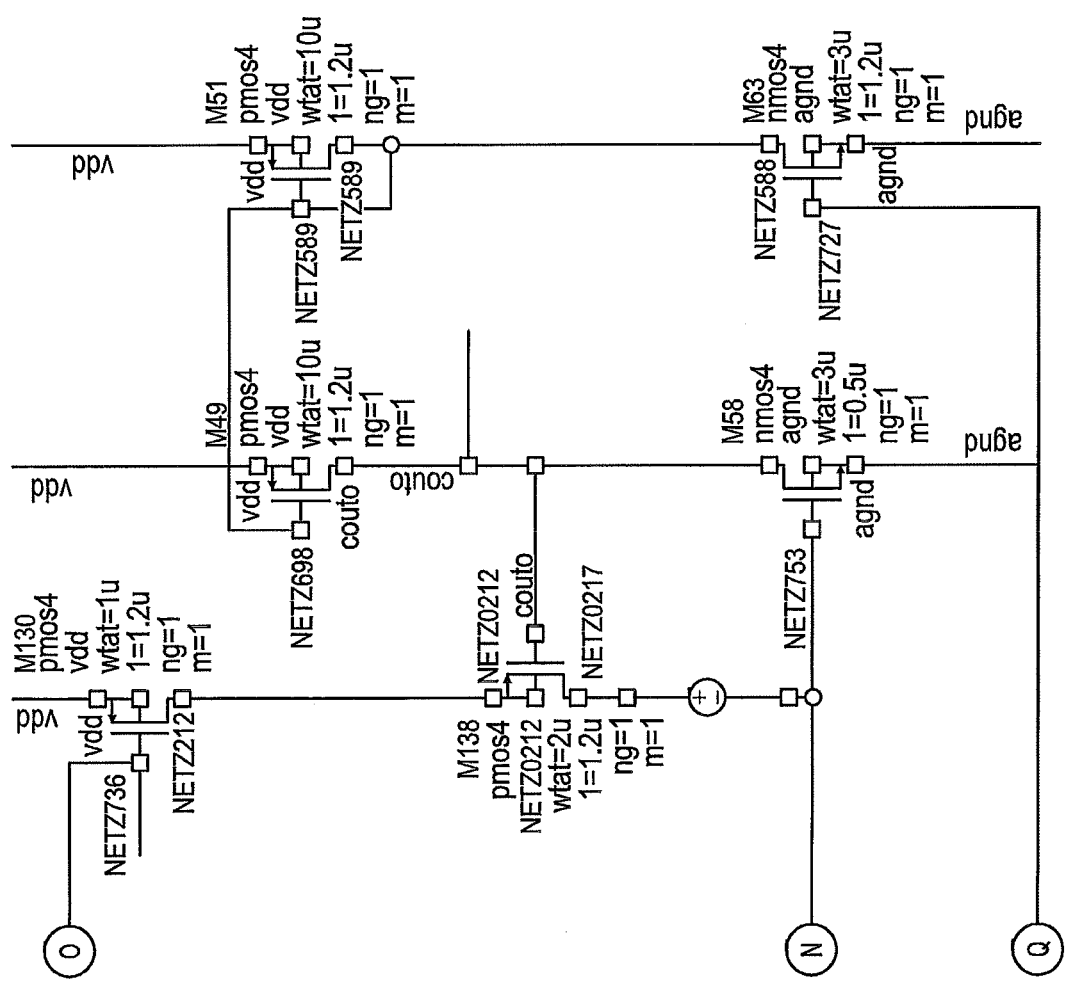
Figure 13G:
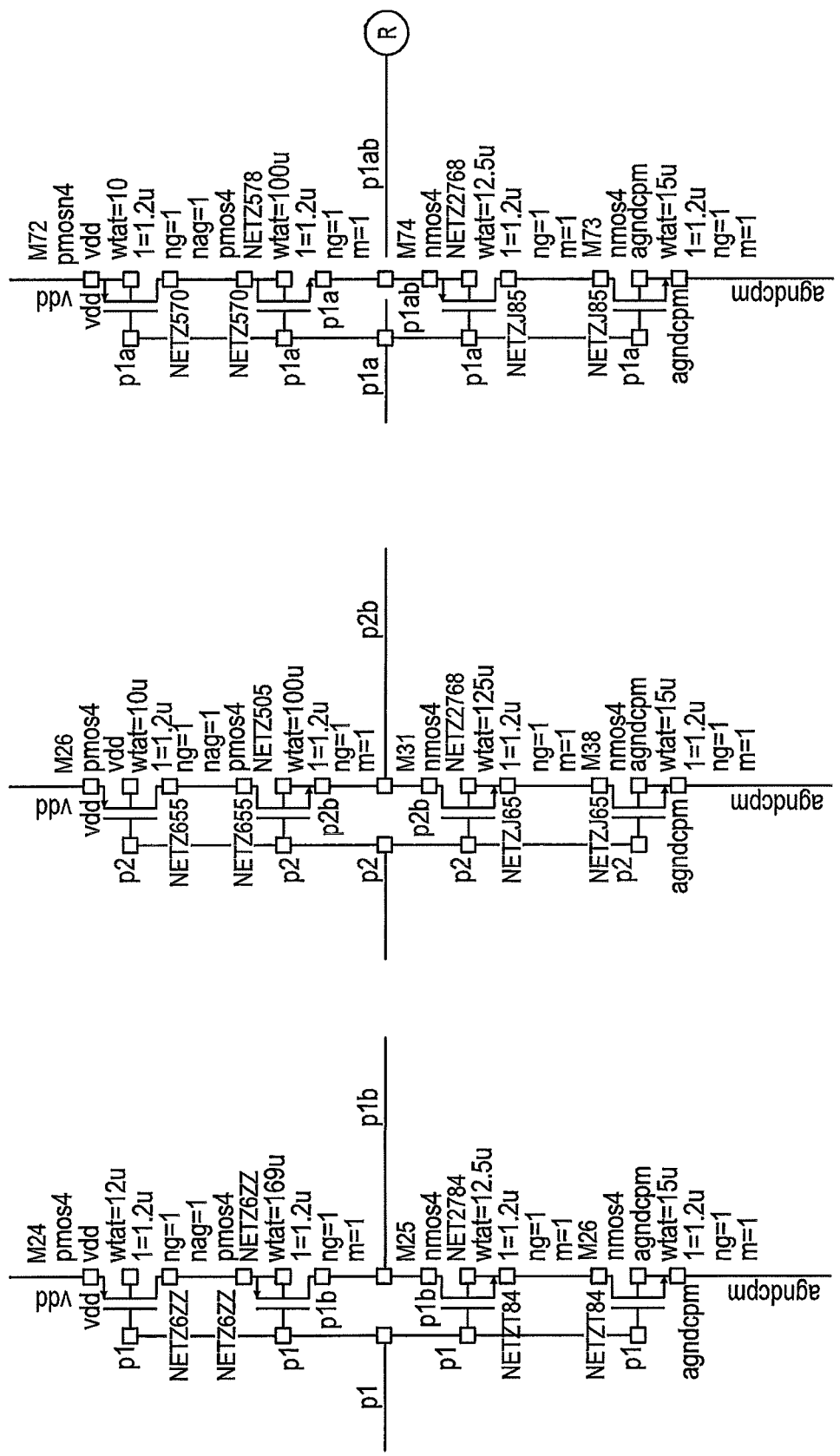
Figure 13H:
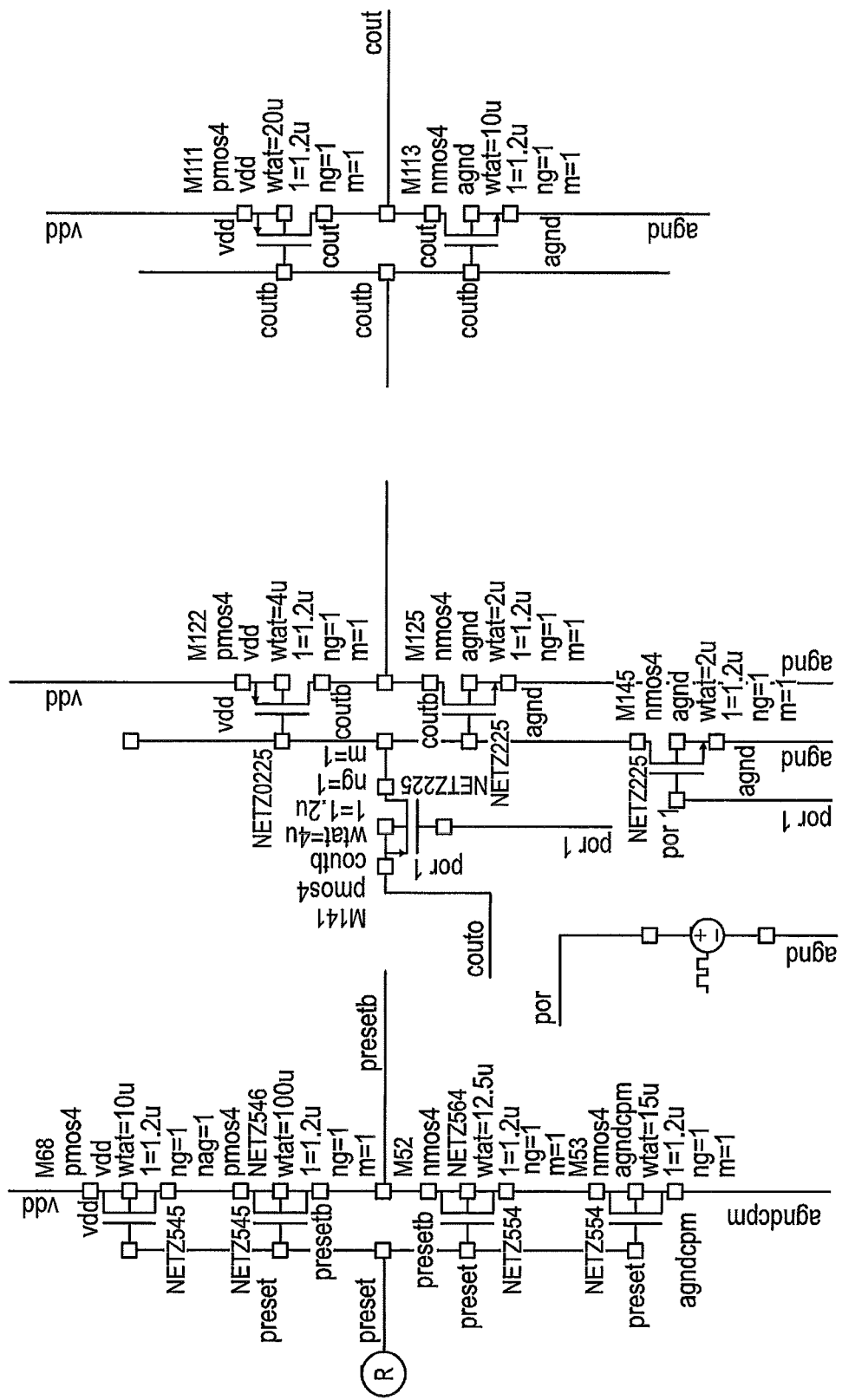
Figure 13I:
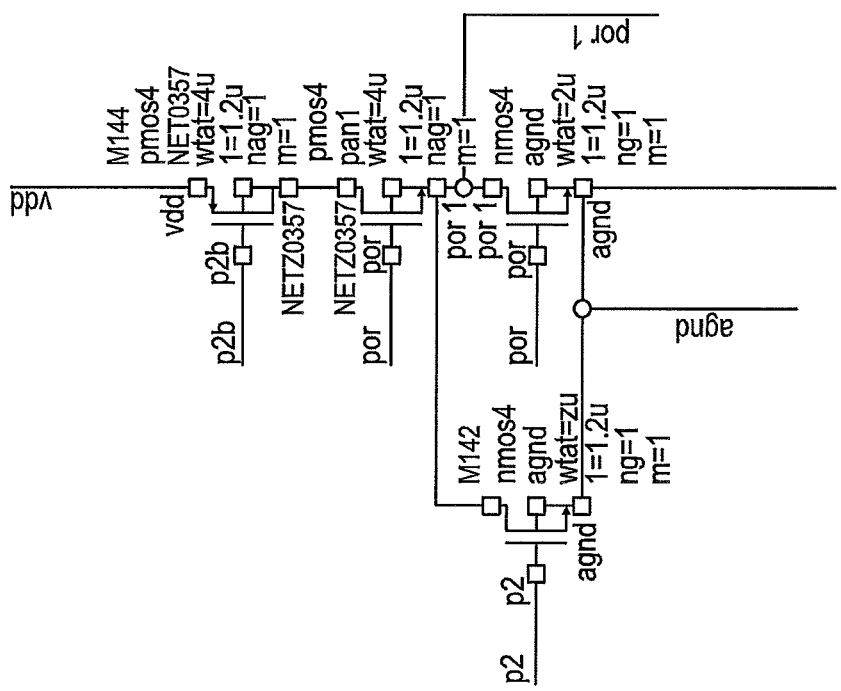

The dominant sources of error in the inventive methods introduced herein come from the finite propagation time and noise on the comparator as illustrated in FIG. 10 as well as metasbility noise of the comparator, where a small overshoot between the comparator reference and the charge node between capacitors results from propagation delay. The error arises due to a delay in stopping the current sources in response to reaching the reference voltage due to finite propagation limitations of the comparator and the current sources. This can be corrected for by several techniques. One technique is to utilize a fast comparator, such as the topology shown in FIG. 11 and whose response is shown in the simulation of FIG. 12 to minimize the propagation error. Additional switched capacitor input branches may be used to transfer a charge equal but opposite of the error onto the comparator control node (vx) as shown in FIG. 13, and this charge voltage may be adjusted by a nuller circuit in closed loop. There are a variety of techniques by which to implement a miller circuit which are known to those skilled in the art.

Alternatively, two comparators may be used with one comparator with very low current and the other comparator which has high gain and is fast due in part to a higher bias current. The first comparator turns on just before the crossover event. This comparator can accommodate large current utilization as it is only on for a brief period each cycle and therefore over time represents a small average current. This technique may be used with or without the nuller previously described.

It will be recognized by those skilled in the art that the ease of implementing matched but scaled current sources to control the transfer of charge between switched capacitors is much more likely to yield a layout which works in a first fabrication yield of silicon than a matched capacitor array that may take additional fabrication steps. Current sources do not require the same level of parasitic extraction and capacitor array tweaking for parasitic non-idealities than is required to implement passive unit devices implementations. Furthermore, those skilled in the art will recognize the various combinations, alterations and implementations that might utilize this technique to replace those which came previously which could not decouple the charge transferred to specific capacitors within a switched capacitor circuit.

Additional switched capacitor paths might be utilized to cancel the error created by the finite propagation and metastability noise of the comparator. The inputs to these additional branches are voltages which create a charge equal to and opposite in sign to the finite propagation delay errors and are created utilizing a closed loop nuller technique of which there is a variety well known to those skilled in the art. For example, the nulling technique can be implemented by adding an additional switched capacitor input leg (such as a leg similar to those illustrated in FIG. 3) summing into the comparison node where the input to that switched capacitor leg input is the common mode. If the same sources are used as in the other input leg(s), and the same comparator is used but both the loading and charging portions occur during the portion of the cycle when the primary current sources are not active, then a charge equal to the error caused by the finite propagation and other non-idealities of the comparator will be loaded onto the capacitor. If this capacitor is then summed into the comparison or reference node (depending upon polarity) during the charge period, when the primary current sources are on, the error due to the comparator will be removed in a process analogous but different to parasitic error removal schemes of FIG. 8 and FIG. 9.

If a nulling methodology such as that described is used, and a differential structure is used, then the nulling replica circuit summed into the comparison or reference node (depending upon polarity) control node must also consider the different control currents I1 and I2, so as to eliminate the error due to finite propagation on the output in proportion to the current scaling factor. The error elimination is easily accomplished with mirror currents from I1 and I2 into the nuller charge paths to create the appropriate input for a 0 (or other) deltaV (differential) input. The correction circuits must create a charge opposite to that of the error in magnitude. DeltaV=0V inputs on the positive and negative input terminals will exacerbate the errors so these errors must be removed in addition to the errors from the deltaV paths in the differential structure with a current source charging a capacitor summed into the control nodes fed from opposite polarity current sources. Finally, a digital correction method can be utilized periodically. This can be done either periodically integrating a known quantity over several cycles and comparing to a known output such as a bandgap reference and adjusting the duty cycle coefficient (on time relative to the other current source for the error). Alternatively, this can be done each cycle by utilizing a replica circuit using the same current sources and comparators during the charge transfer phase (second phase where input charge is transferred to the output) and adjusting duty cycle to eliminate any error. The adjustment may be a scaling factor to adjust for error in current source magnitudes or alternatively may be a fixed offset to account for finite comparator propagation or switch capacitor charge injection errors.

Figure 14:
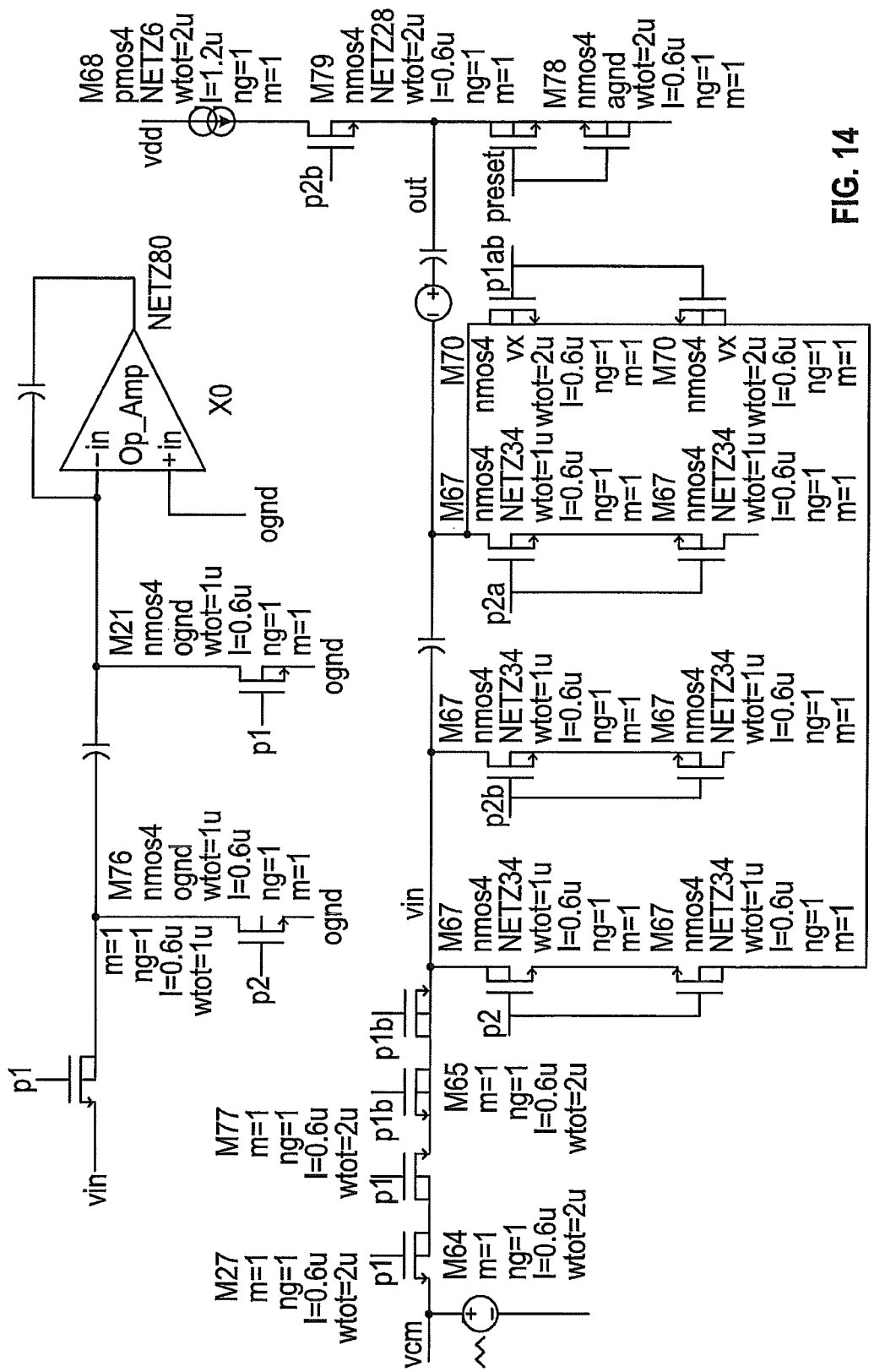
FIG. 14 is a schematic of a switched capacitor comparator based integrator implementation and an op amp based implementation for comparison with transistor switches.

FIG. 14 is a schematic of a switched capacitor comparator based integrator implementation and an op amp based implementation for comparison with transistor switches. As shown the circuit is an integrator. Discharging the output capacitor each cycle creates a gain circuit (voltage across C2 is reset each cycle).

Neurons generally have multiple inputs and outputs each of which have their own weighting. The use of capacitor arrays on so many variably weighted connections to create weighting based upon capacitive ratios would be unwieldy and would require redundant capacitor arrays, which may not be utilized depending upon the reconfiguration parameters. The use of magnitude or duty cycle controlled current sources summed into nodes of the comparator based switched capacitor circuit provides great flexibility to adjust the gain of the cell in conformance with the desired weightings of the inputs, a flexibility which just is not available using any other method. Additionally, fixed current sources can be applied to replicate the fixed bias input of the standard neuron (see FIG. 15, 66) or the biases may be implemented as an additional input switched capacitor coupled to the comparison node just as the inputs to the neuron are, but coupled to a fixed input voltage. A current source similar to those setting the weights of the inputs may then be coupled to the comparison node in conformance with the bias current such that the current source adjusts the bias to a desired value in the same way that the inputs are weighted using their associated current sources.

Figure 15:
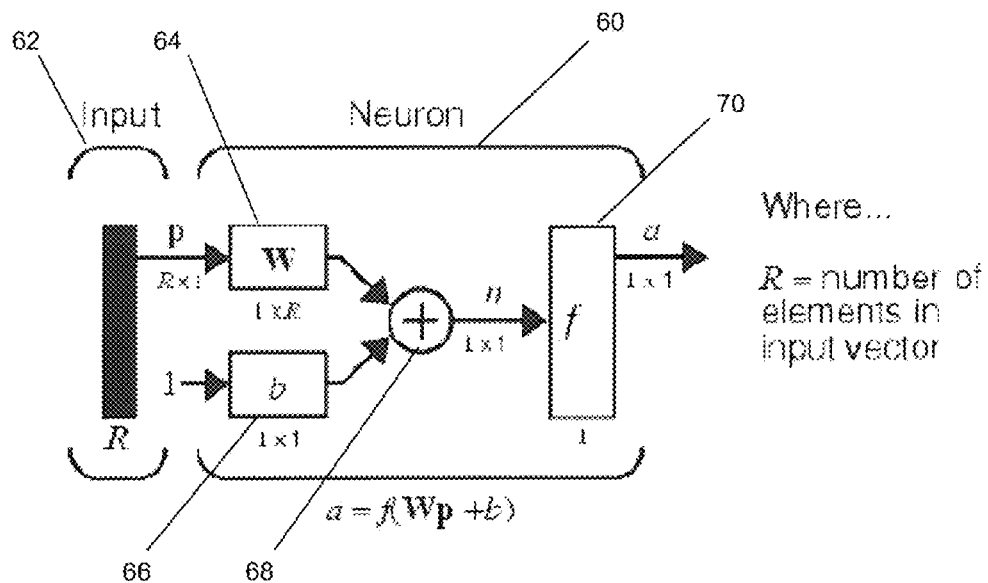
FIG. 15 Is a flow diagram of a single neuron illustrating the weighted inputs, the bias input, and the decision function.
Figure 16:
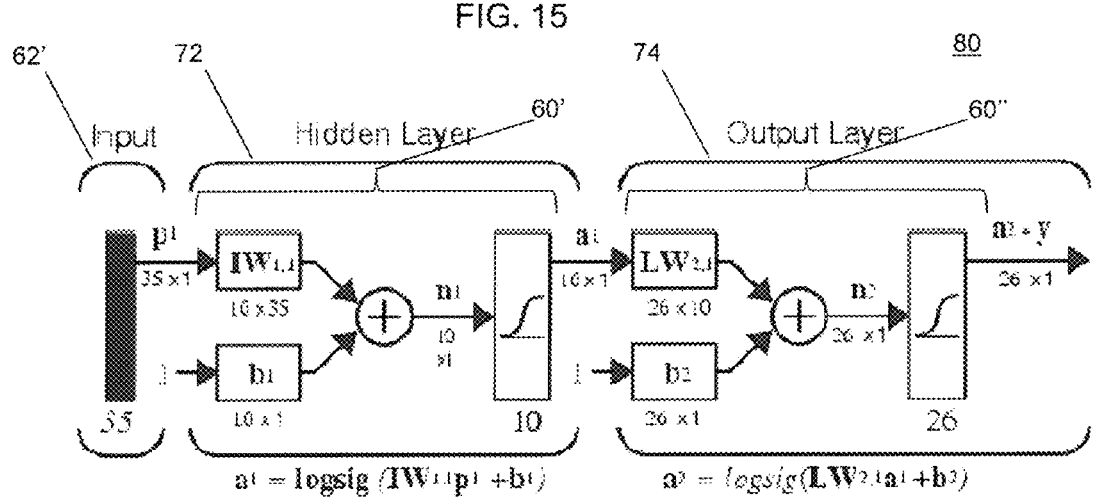
FIG. 16 is a flow diagram of neurons in two layers.
Figure 18:
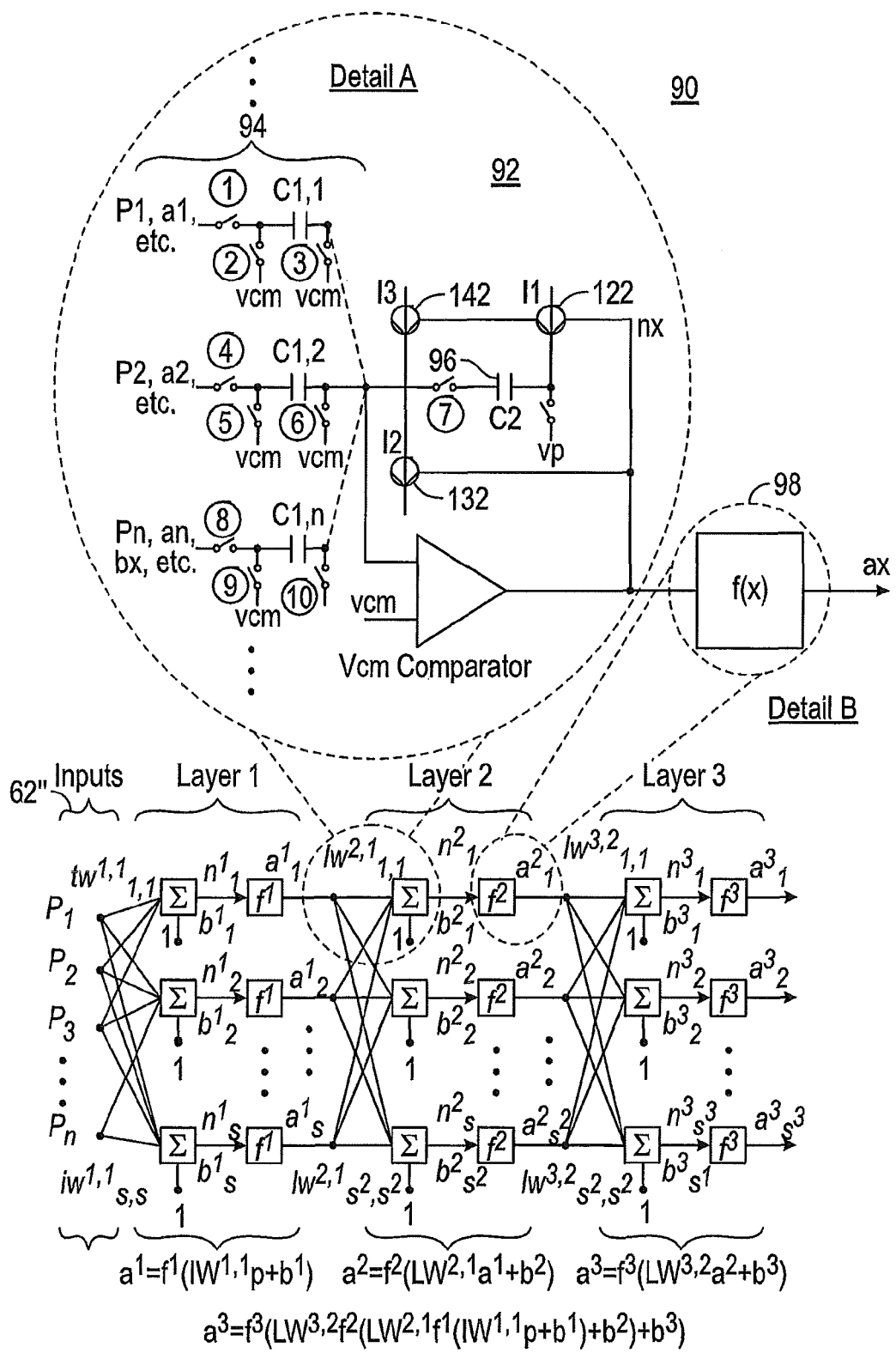
FIG. 18 is a schematic of a comparator based programmable gain switched capacitor circuit and how its constituent parts implement the weighting and summing functions of the neurons in a multiple layer neuron network according to an embodiment of the invention.

FIG. 15 shows a basic neuron 60 with an input 62 with a weighted input 64, a bias input 66, a summer 68 and a decision function 70. In inventive embodiments, the currents sources shown in FIG. 4 or 5 can be repeated multiple times for the different weighted inputs and a bias is created with one or more fixed current sources. Although these current sources are described as multiple current sources, they may also be implemented as a combined current source of appropriate magnitude (the magnitude of the sum of all the described sources). The decision circuit can be incorporated into the switched capacitor structure or appended as a series structure. FIG. 16 extends this concept to an input layer feeding a first neuron 60" in a hidden layer 72, and a neuron 60" in the output layer 74 to convey the structure of a neural network 80. In embodiments the decision function can be implemented with a comparator, linear transconductor, a transconductor with triode edges, a wavelet, etc. Note that when we are training and refer to an input layer which would result in a desired target output layer we are referring to the inputs as shown in FIG. 18 with a similar final set of values called outputs which is not shown in FIG. 18 but which would be coupled to the final 'a' values from the final layer (in FIG. 18 layer 3). This differs somewhat from FIG. 16 where the output layer is labelled including a neuron and not just a final set of output values.

Figure 17:
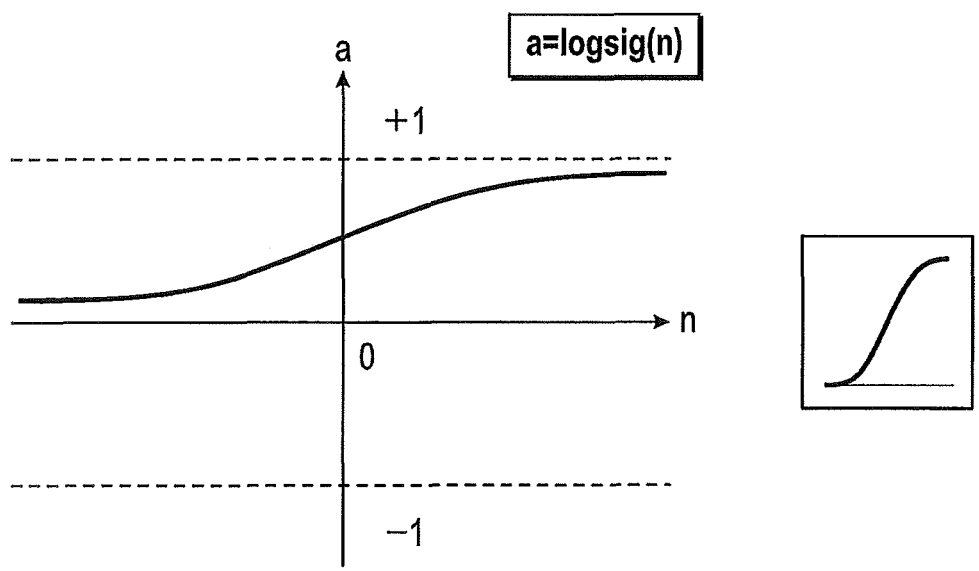
FIG. 17 is a graphical representation of a decision function.

FIG. 17 illustrates a typical log-sigmoid transfer function for a decision circuit implementation. A decision function compares the output of the summed weighted inputs and biases against a transfer function and produces an output. The output could be a comparator output where the decision function is a comparator comparing the summer output to a reference voltage. Furthermore, a decision function could be a transconductor producing a linear crossover characteristic, such as that shown in FIG. 19, and implemented as shown in the schematic in FIG. 20. The decision function may also be a log-sigmoid type function created by allowing the transconductor to have soft edge regions, or may be one of many functions including a wavelet function. A comparator, linear or log-sigmoid transfer function is readily implemented with analog circuitry.

FIG. 18 is a schematic representation of a multi-layer neural network 90, including a series of inputs 62" and a set of hidden or internal layers (layer 1, layer 2, layer 3), and explicitly shows all the weighted connections between neurons in the different layers, as well as the bias, summer and decision components. Not shown would be a series of outputs similar to the series of inputs 62" which would be coupled to the final layer. As shown in Detail A, the weighted inputs and summer are associated with the switched capacitor circuit 92 with the configuration of FIG. 5, where multiple switched input capacitors 94 form the weighted inputs, the output capacitor 96 is the summer and the output of the switched capacitor circuit is coupled to the decision circuit 98 whose output is weighted and coupled to neurons in the next layer. For the next layer the outputs of the decision circuit become the inputs in Detail A and so forth. The current sources 122, 132, and 142 (I1, I2, and I3) control the weighted coefficients and additional legs or the current sources may be used to implement the biases. It is noted that currents I2 and I3 are shown as the sum of the individual weighting currents for all of the summed inputs and biases. Currents I2 and I3 are shown combined rather than repeating them explicitly and making the diagram more complex. Error minimizing functions are used to modify the weighting coefficients (currents) to train a neural network through back or forward propagation until a minimization goal is met. Propagation routines may thus adjust the current sources to train the neural network against such a goal.

Figure 19:
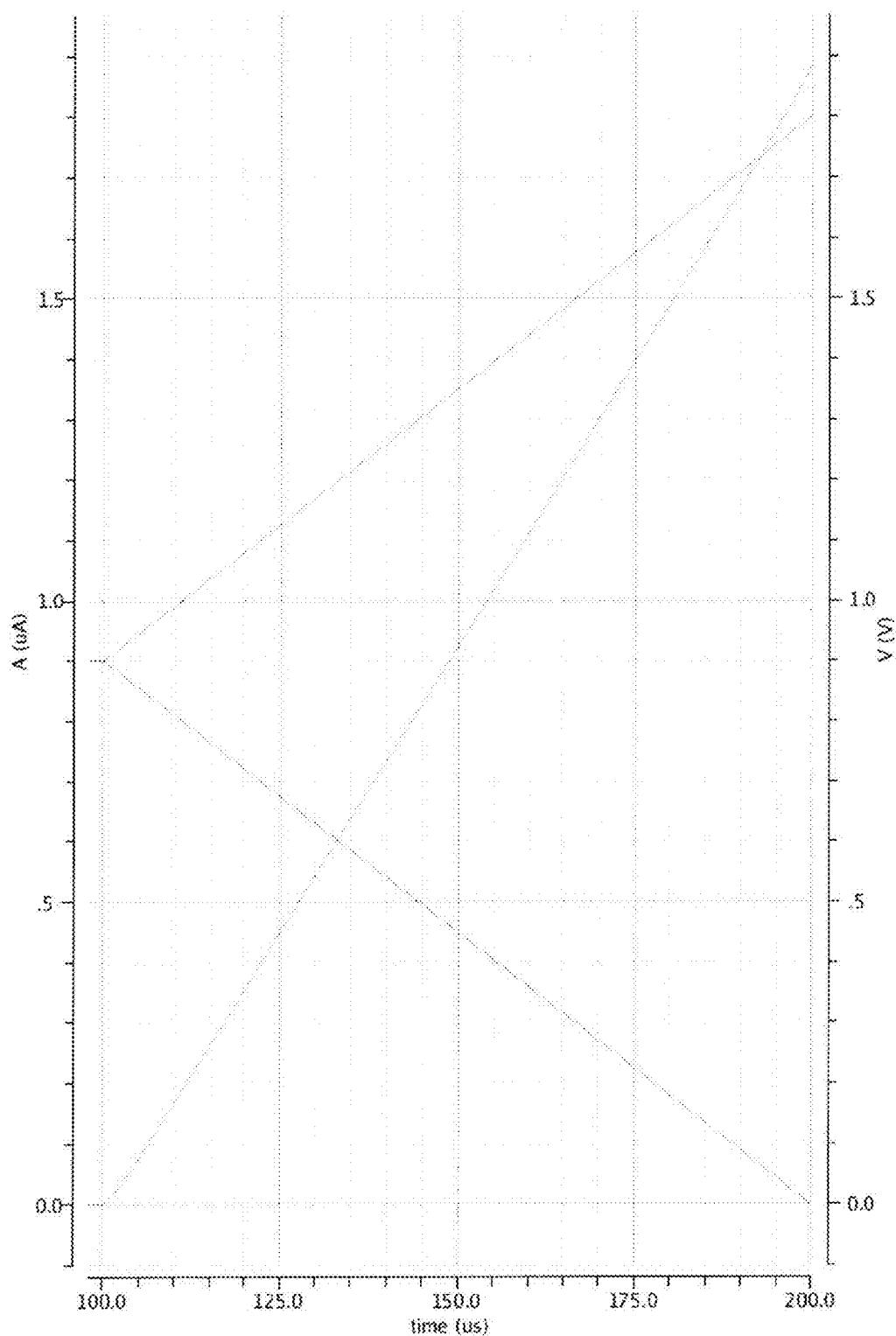
FIG. 19 is a graphical representation of a differential transconductor response for implementing a decision circuit function.

FIG. 19 is a graphical representation of a differential transconductor response for implementing a decision circuit function in the neural network of embodiments of the invention.

Figure 20:
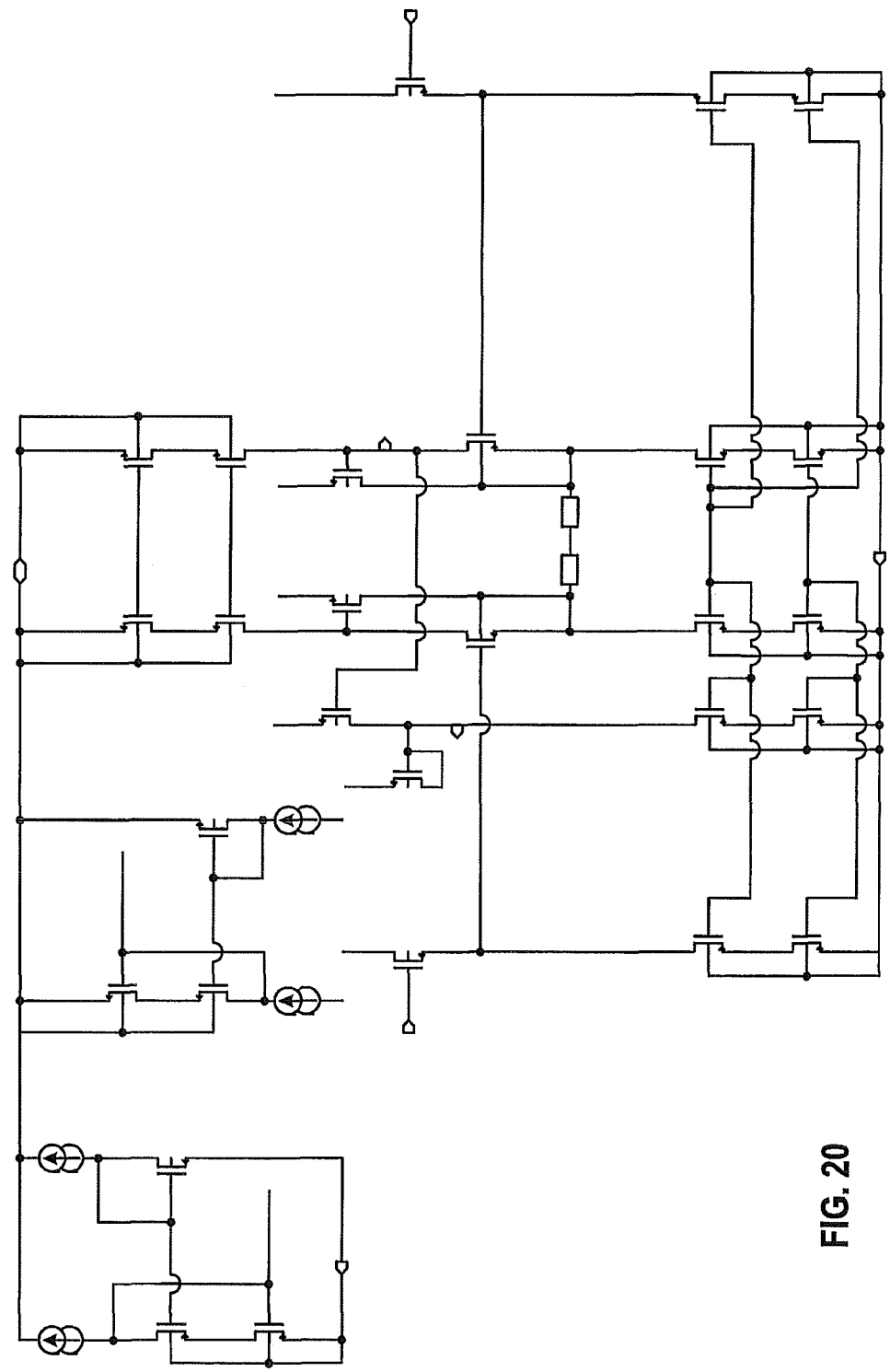
FIG. 20 is a schematic representation of a decision circuit according to an embodiment of the invention.

FIG. 20 shows a schematic implementation for a decision circuit used in an inventive embodiment of a neural network.

In an alternative embodiment, a reference voltage is coupled to a single input capacitor of each neuron rather than a plurality of input capacitors each with an associated current to weight it. Instead the weighted inputs are provided as a plurality of current sources representing the weighted inputs and coupled to the comparison node. These weighted inputs are created from a current representing the input and a second current representing the weighting as inputs to an analog multiplier and output the product of the two currents is coupled to the comparison node. Using this approach the number of capacitors is further reduced hut at the expense of analog multipliers. Capacitors in many processes, however, are larger than total size of an analog multiplier and therefore this might be a desirable tradeoff The foregoing description is illustrative of particular embodiments of the invention, but is not meant to be a limitation upon the practice thereof. The following claims, including all equivalents thereof, are intended to define the scope of the invention.

The invention claimed is:

1. A neural network comprising:
an input layer;
an output layer;
one or more hidden layers;
neurons comprising a switched capacitor circuit, wherein said switched capacitor circuit comprises a comparison device and a plurality of switched input capacitors and a single output switched capacitor;
wherein for each neuron at least one current source is coupled to a node shared by said plurality of switched input capacitors, said comparator and said output switched capacitor for each of said switched input capacitors;
a single current source is coupled to said output capacitor; wherein said at least one current source coupled to said input capacitor current is programmed in magnitude relative to the output capacitor current source so as to program the weighting coefficients of the weighted inputs;
a training device where an error propagation minimization function is used to adjust the magnitude of said weighting coefficients in conformance with an input layer and a target output layer; and
wherein a floating gate non-volatile memory is used to store the magnitude of said at least one current source, and thus the weighting coefficients, once the error propagation minimization in said neural network is trained.

2. The neural network of claim 1 wherein a digital non-volatile memory is used to store the magnitude of said at least one current source, and thus the weighting coefficients, once error propagation minimization in said neural network is trained.

3. The neural network of claim 1 further comprising a set of bias inputs created with an additional input switched capacitor coupled to a reference and a current source coupled to said shared node to establish the weighting of said bias input.

4. The neural network of claim 1 wherein said plurality of current sources coupled to said plurality of input capacitors which is used to weight said input connections are combined into a reduced number of current sources or a single current source of a magnitude equal to the sum of said plurality of current sources.

5. The neural network of claim 1 further comprising:
at least two of said neurons; and
a single input switched capacitor in place of said plurality of input capacitors coupled to a reference;
wherein current sources whose magnitudes correlate to input values are coupled to one or more current multipliers at each of said neurons to multiply said input currents by desired weight coefficients;
wherein said multiplied input currents are coupled to said comparison node.

6. The neural network of claim 5 wherein said neural network learns by adjustment of said weighting coefficients according to an error minimization function which propagates through the neurons until a minimization constraint is reached.

7. The neural network of claim 6 where said multiplier is an analog multiplier.

* * * * *